US012683308B2

(12) United States Patent
Enomoto et al.

(10) Patent No.: US 12,683,308 B2
(45) Date of Patent: Jul. 14, 2026

(54) CONNECTION STRUCTURE FOR CONNECTOR

(71) Applicant: NIPPON TANSHI CO., LTD., Kanagawa (JP)

(72) Inventors: Shinya Enomoto, Kanagawa (JP); Osamu Nishimura, Kanagawa (JP)

(73) Assignee: NIPPON TANSHI CO., LTD., Kanagawa (JP)

( * ) Notice: Subject to any disclaimer, the term of this patent is extended or adjusted under 35 U.S.C. 154(b) by 328 days.

(21) Appl. No.: 18/534,237

(22) Filed: Dec. 8, 2023

(65) Prior Publication Data

US 2024/0162639 A1 May 16, 2024

Related U.S. Application Data

(63) Continuation of application No. PCT/JP2022/030081, filed on Aug. 5, 2022.

(30) Foreign Application Priority Data

Jun. 8, 2021 (JP) ................................ 2021-096022

(51) Int. Cl.
*H01R 12/71* (2011.01)
*H01R 13/639* (2006.01)

(52) U.S. Cl.
CPC ........... *H01R 12/71* (2013.01); *H01R 13/639* (2013.01)

(58) Field of Classification Search
CPC .. H01R 12/71; H01R 13/639; H01R 12/7082; H01R 12/75; H01R 13/74; H01R 12/721; H05K 1/02
See application file for complete search history.

(56) References Cited

U.S. PATENT DOCUMENTS

2001/0034156 A1 10/2001 Yamane

FOREIGN PATENT DOCUMENTS

| | | | | |
|---|---|---|---|---|
| CN | 108470998 A | * 8/2018 | | H01R 12/721 |
| CN | 109997280 B | * 5/2021 | | H01R 12/721 |
| CN | 117242648 A | * 12/2023 | | H01R 12/7029 |
| JP | S 6436989 U | 3/1989 | | |
| JP | H 01183005 A | 7/1989 | | |
| JP | 2001307831 A | 11/2001 | | |
| JP | 2001319712 A | * 11/2001 | | H01R 12/87 |
| JP | 2002270301 A | 9/2002 | | |

(Continued)

OTHER PUBLICATIONS

International Search Report (with English translation) for corresponding Application No. PCT/JP2022/030081, dated Oct. 25, 2022, 6 pages.

*Primary Examiner* — Travis S Chambers
(74) *Attorney, Agent, or Firm* — Dority & Manning, P.A.

(57) ABSTRACT

A connection structure for a connector to be connected to a connection part of a circuit board supported by a holder, wherein the connection part and the connector are detachably joined, and the holder is provided with: a circuit board restricting part configured to engage with the circuit board electrically connected to the connector to restrict movement of the circuit board in a direction separating from the connector; and a connector restricting part configured to engage with the connector electrically connected to the circuit board to restrict movement of the connector in a direction separating from the circuit board.

9 Claims, 16 Drawing Sheets

(56) References Cited

FOREIGN PATENT DOCUMENTS

| | | | | | |
|---|---|---|---|---|---|
| JP | 2002270313 | A | | 9/2002 | |
| JP | 2008226714 | A | | 9/2008 | |
| KR | 20210004116 | A | * | 1/2021 | ............. H01R 13/58 |
| TW | 560241 | B | * | 11/2003 | ........... H05K 3/3405 |
| TW | 202033079 | A | * | 9/2020 | ............. H05K 1/185 |
| WO | WO-2017194044 | A1 | * | 11/2017 | ......... H01R 12/7017 |

* cited by examiner

CONNECTION STRUCTURE FOR CONNECTOR

CROSS REFERENCE TO RELATED APPLICATIONS

This application is a continuation of International Application No. PCT/JP2022/030081, filed on Aug. 5, 2022, which, in turn, claims priority to Japanese Patent Application No. 2021-096022, filed on Jun. 8, 2021, both of which are hereby incorporated herein by reference in their entireties for all purposes.

TECHNICAL FIELD

The present invention relates to a connection structure for a connector to a circuit board.

BACKGROUND ART

A connector for a printed circuit board which can easily find failure of connection of contacts is known (for example, Patent Document 1). The connector includes a housing and multiple contacts. The housing is provided with an opening into which the printed circuit board is inserted. The opening is provided with multiple grooves arranged in the extending direction of the opening, and the contacts are respectively received in the grooves. When the printed circuit board is inserted in the opening, each of the contacts is brought into contact with a circuit pattern provided on the printed circuit board.

Further, the housing is provided with a window that extends from the upper surface of the housing to an inside of the opening and permits the inserted printed circuit board to be visually checked. By visually checking the inserted printed circuit board through the window, the worker can check whether the end surface or edge part of the printed wiring board is inserted to a predetermined contact mating position.

PRIOR ART DOCUMENT(S)

Patent Document(s)

[Patent Document 1] JP2001-307831A

SUMMARY OF THE INVENTION

Task to be Accomplished by the Invention

In the connector described in Patent Document 1, the circuit board (printed circuit board) is not secured to the housing, and therefore, there is a risk that the circuit board may be detached from the housing so that the electrical connection may be lost.

In view of the foregoing background, an object of the present invention is to provide a connection structure for a connector to a circuit board in which electrical connection is not easily lost.

Means to Accomplish the Task

To achieve the above object, one aspect of the present invention provides a connection structure (1, 101, 201, 301, 401, 600, 700) for a connector (3) to be connected to a connection part of a circuit board (2) supported by a holder (10, 202, 601, 701), wherein the connection part and the connector are joined in an insertable/removable manner, and the holder is provided with: a circuit board restricting part (15) configured to engage with the circuit board electrically connected to the connector to restrict movement of the circuit board in a direction separating from the connector; and a connector restricting part (17, 203, 602, 702G) configured to engage with the connector electrically connected to the circuit board to restrict movement of the connector in a direction separating from the circuit board.

According to this aspect, the movement of the circuit board in the direction separating from the connector is restricted by the circuit board restricting part, and the movement of the connector in the direction separating from the circuit board is restricted by the connector restricting part. Therefore, the circuit board and the connector are hard to be separated, and electrical connection is not easily lost.

In the above aspect, preferably, the connector is provided with a flange extending out in a direction perpendicular to a connection direction of the connector, the holder is provided with a support surface for supporting the circuit board, the connector restricting part includes a projecting piece (17, 203) that projects from a part of the support surface on a side of the flange remote from the circuit board, and when the connector is moved in a direction separating from the circuit board, the projecting piece contacts the flange and restricts movement of the connector.

According to this aspect, the movement of the connector in the direction separating from the circuit board is restricted by the flange and the projecting piece. Therefore, the circuit board and the connector are hard to be separated, and electrical connection is not easily lost.

In the above aspect, preferably, the flange is provided with a pressing surface (54) facing a distal side in the connection direction.

According to this aspect, by pressing the pressing surface, the worker can apply a load so as to bring the connector closer to the circuit board. Thereby, the circuit board and the connector can be electrically connected.

In the above aspect, preferably, the projecting piece is provided with a slope (107) that is inclined toward the circuit board as approaching the support surface.

According to this aspect, when the worker moves the flange along the slope to bring the circuit board closer to the support surface in order to make the circuit board held on the support surface, the flange is guided by the slope and is moved toward the circuit board. As a result, the connector is moved to be closer to the circuit board, whereby the circuit board and the connector can be electrically connected more reliably.

In the above aspect, preferably, a surface of the flange on a side of the circuit board is in parallel with an end surface of the circuit board on a side of the connection part.

According to this aspect, the worker can know the joining state between the circuit board and the connector from the distance between the surface of the flange on the side of the circuit board and the end surface of the circuit board on the side of the connection part.

In the above aspect, preferably, when a distance between the circuit board and the connector in an insertion direction is greater than a predetermined threshold value, the flange and the projecting piece cooperate to prohibit support of the circuit board on the holder.

According to this aspect, when the circuit board is supported by the holder, the moving distance of the connector in the direction separating from the circuit board can be suppressed to be less than or equal to the threshold value. Therefore, by properly setting the threshold value, it is possible to prevent the electrical connection between the connector and the circuit board from being lost or the connector and the circuit board from being physically separated.

In the above aspect, preferably, the connector includes at least one terminal member (23, 303, 403) which can be electrically connected to a terminal(s) (8) of the circuit board by contacting the terminal(s) of the circuit board, and when the distance is less than or equal to the threshold value, all of the terminal member(s) of the connector is/are connected to the corresponding terminal(s) of the circuit board.

According to this aspect, it is possible to avoid a situation in which the circuit board is supported by the holder, with the electrical connection between the connector and the circuit board being lost.

In the above aspect, preferably, the connector includes at least one terminal member (23, 303, 403) which can be electrically connected to a terminal(s) (8) of the circuit board by contacting the terminal(s) of the circuit board, the terminal member is provided with multiple contacts configured to contact the terminal of the circuit board, and when the distance is less than or equal to the threshold value, at least one contact of the multiple contacts included in each terminal member contacts the corresponding terminal of the circuit board.

According to this aspect, it is possible to avoid a situation in which the circuit board is supported by the holder, with the electrical connection between the connector and the circuit board being lost.

In the above aspect, preferably, the connector includes at least one terminal member (23, 303, 403) which can be electrically connected to a terminal(s) (8) of the circuit board by contacting the terminal(s) of the circuit board, the terminal member is provided with multiple contacts configured to contact the terminal of the circuit board, and when the distance is less than or equal to the threshold value, all of the contacts of the terminal member contact the corresponding terminal of the circuit board.

According to this aspect, when the circuit board is supported by the holder, all of the contacts are in contact with the corresponding terminals of the circuit board, and thus, the electrical connection between the connector and the circuit board is not easily lost.

In the above aspect, preferably, the connection part includes an electrically conductive pattern extending in the connection direction on a surface of the circuit board.

According to this aspect, the distance range in which the connector is electrically connected to the circuit board becomes long in the connection direction, and thus, electrical connection of the connector can be easily obtained.

Effect of the Invention

According to the above aspect, it is possible to provide a connection structure for a connector to a circuit board in which electrical connection is not easily lost.

MODE(S) FOR CARRYING OUT THE INVENTION

In the following, one embodiment of a connection structure for a connector according to the present invention will be described with reference to the drawings.

First Embodiment

Figure 1:
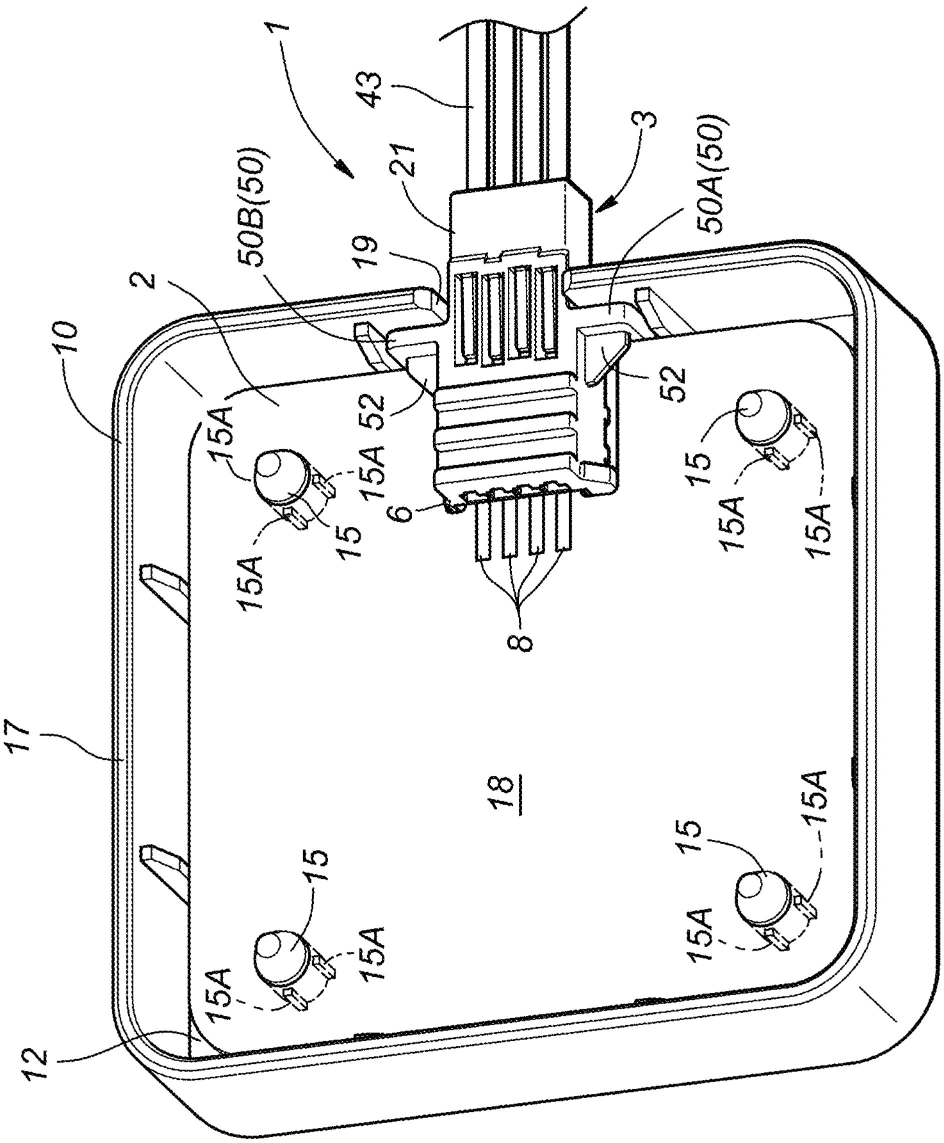
FIG. 1 is a perspective view showing a connection state of a connector, a circuit board, and a holder regarding a connection structure for a connector according to the first embodiment.
Figure 1:
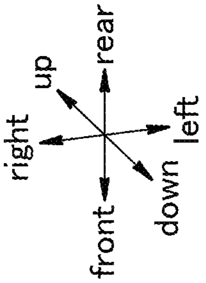

A connection structure for a connector according to the first embodiment (hereinafter, the connection structure 1) is a structure for connecting a circuit board 2 and a connector 3. As shown in FIG. 1, the circuit board 2 and the connector 3 are connected when the end portion of the circuit board 2 is inserted into the connector 3.

In the following, description will be made with the insertion direction of the circuit board 2 into the connector 3, namely, the connection direction of the connector 3 to the circuit board 2, being defined as a forward direction, as shown in FIG. 1. Note, however, that this definition of direction is for convenience of explanation, and the definition of direction is not limited to this.

Figure 2:
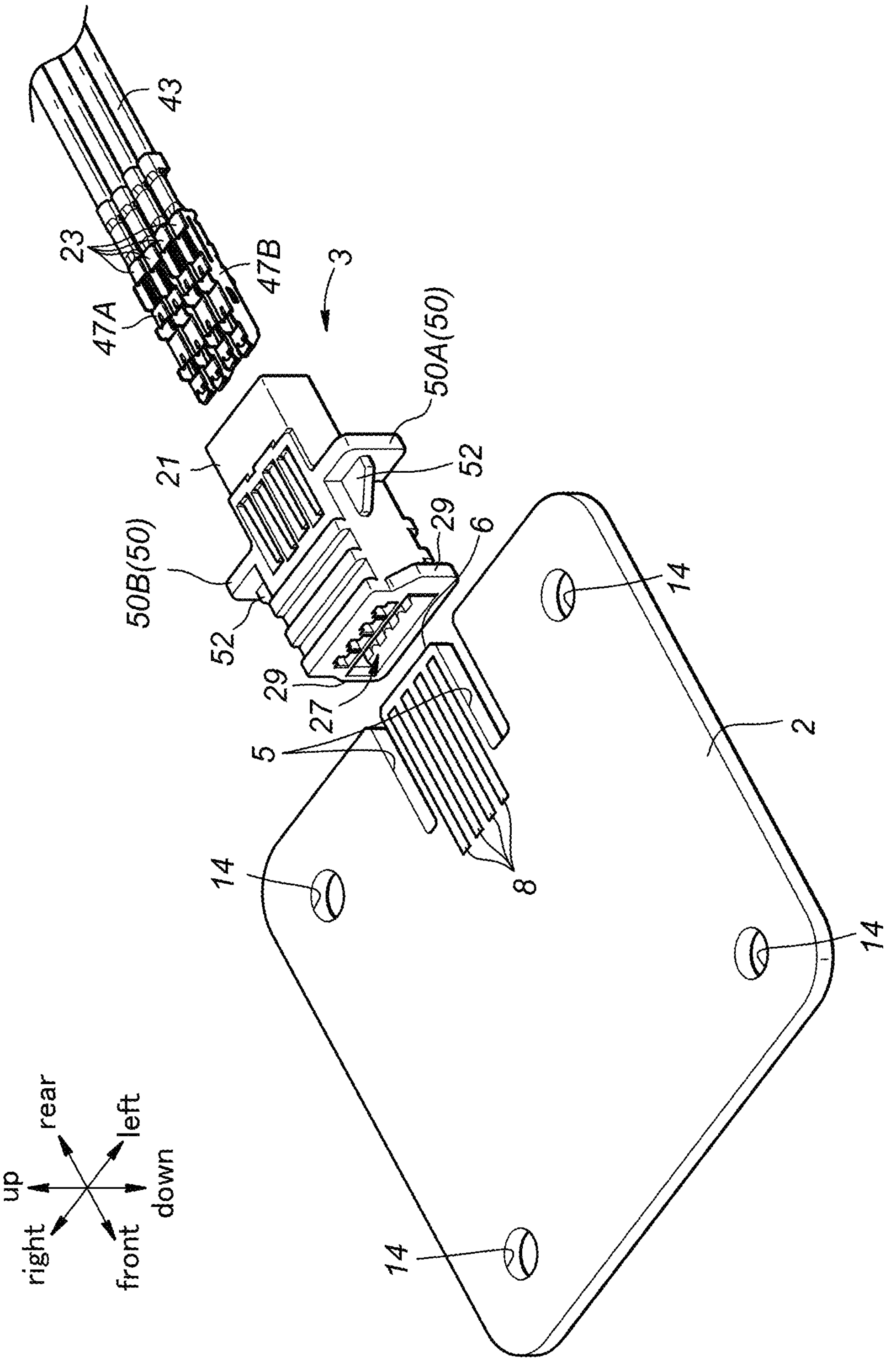
FIG. 2 is an exploded perspective view of the circuit board and the connector regarding the connection structure for the connector according to the first embodiment.

The circuit board 2 is a plate-shaped board, and consists of a so-called PCB (print circuit board). The circuit board 2 is in a rectangular plate shape having sides extending front-rear and left-right directions. On a surface of the circuit board 2, a metal wiring (not shown in the drawings) is provided. As shown in FIG. 2, a rear portion of the circuit board 2 is provided with two slits 5 that extend forward. In the present embodiment, the widths of the slits 5 in the left-right direction are set to be different from each other, but the present invention is not limited to this mode.

As shown in FIG. 2, on a surface of a part of the circuit board 2 between the two slits 5 (hereinafter, the connection part 6), terminals 8 connected to the wiring provided on the circuit board 2 are provided. Each terminal 8 is configured by an electrically conductive pattern extending in the front-rear direction. The connector 3 is a so-called card edge connector which is connected to the connection part 6 from the rear in an insertable/removable manner.

As shown in FIG. 1, in addition to the circuit board 2 and the connector 3, the connection structure 1 includes a holder 10 for supporting the circuit board 2. The holder 10 has a horizontal surface (hereinafter, the support surface 12) on the upper side thereof. The support surface 12 is provided with circuit board restricting parts 15 for restricting the forward movement of the circuit board 2.

In the present embodiment, as shown in FIG. 2, through holes 14 are further provided in appropriate positions of the circuit board 2, and the circuit board restricting parts 15 are configured as convex parts that protrude from the support surface 12 in a cylindrical columnar shape into the respective through holes 14. The circuit board 2 is supported on the support surface 12 of the holder 10 in a state in which the circuit board restricting parts 15 are inserted in the through holes 14. As shown in FIG. 1, the tip of each circuit board restricting part 15 is preferably tapered. Thereby, the worker can easily insert the circuit board restricting part 15 into the through hole 14. The circuit board restricting part 15 may be provided, on the outer circumferential surface thereof, with ribs 15A for holding the circuit board 2 in a position spaced from the support surface 12. Each rib 15A forms a ridge that extends from the lower end (base end) of the circuit board restricting part 15 to a predetermined height.

The circuit board restricting parts 15 restrict the movement of the circuit board 2 relative to the holder 10 in the front-rear direction and in the left-right direction, and the circuit board 2 is movable only upward relative to the support surface 12. However, the configuration of the circuit board restricting parts 15 is not limited to this mode. For example, the circuit board restricting parts 15 may have any form so long as they restrict the forward movement of the circuit board 2 and allows the circuit board 2 to move upward relative to the support surface 12.

On the support surface 12, a projecting wall 17 (projecting piece) is erected. The projecting wall 17 forms a wall body surrounding the circuit board 2. In the present embodiment, as shown in FIG. 1, the support surface 12 has a square shape matching the circuit board 2, and the projecting wall 17 extends along an edge of the support surface 12. The projecting wall 17 has a square tubular shape surrounding the circuit board 2. Thus, the holder 10 has a square box shape, and the inner circumferential surface of the projecting wall 17 and the support surface 12 define an accommodation space 18 for accommodating the circuit board 2.

The projecting wall 17 is provided, in a part rearward of the connection part 6, with an opening 19 that connects the inner side and the outer side of the projecting wall 17. An upper edge of the opening 19 is opened. When the connector 3 is connected to the circuit board 2 and the circuit board 2 is supported by the holder 10, the connector 3 is disposed to pass through the opening 19.

As shown in FIG. 2, the connector 3 includes a housing 21 and multiple terminal members 23.

Figure 3:
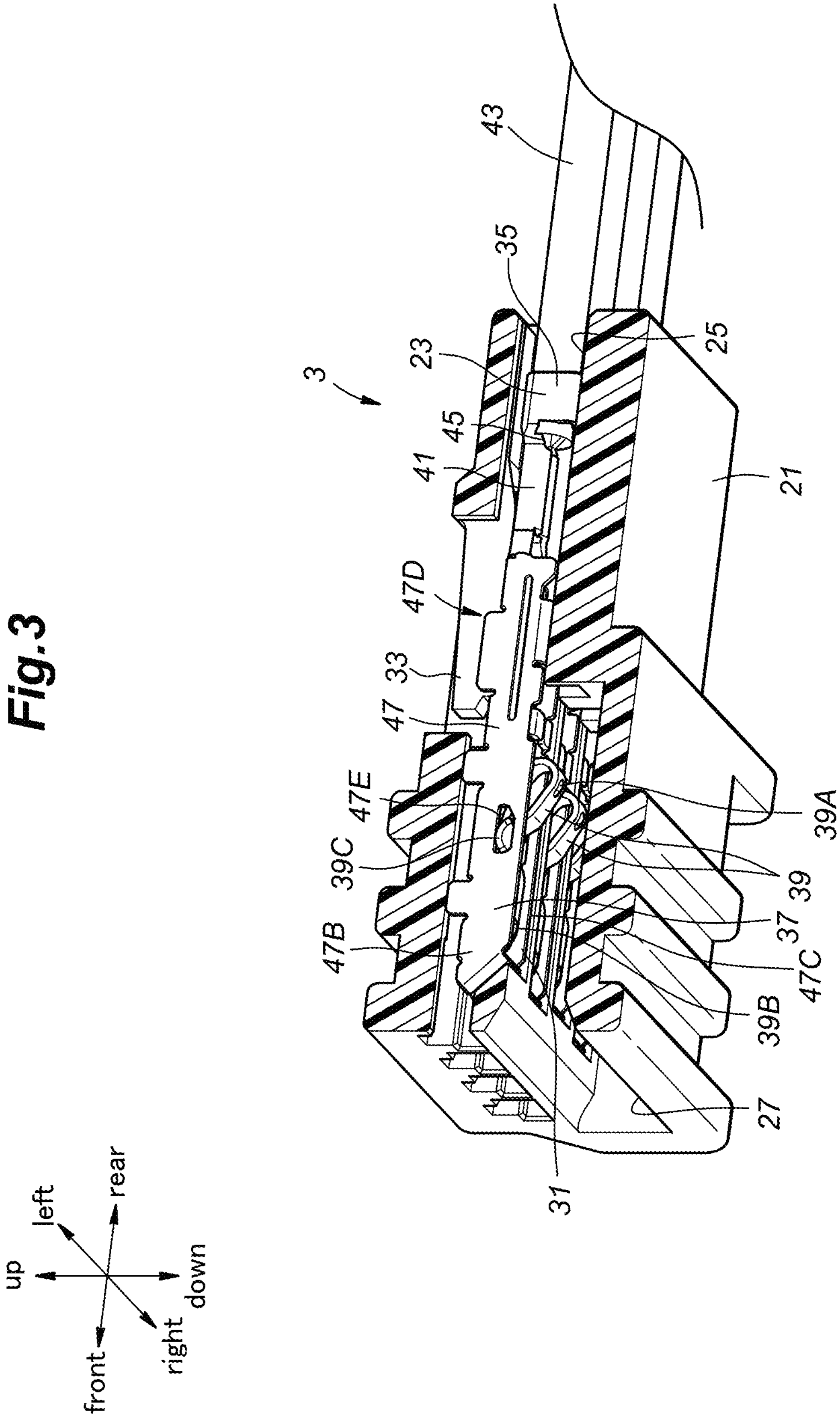
FIG. 3 is a perspective sectional view of the connector regarding the connection structure for the connector according to the first embodiment.

The housing 21 is an insulating member made of resin. The housing 21 has a substantially rectangular parallelepiped shape extending in the left-right direction. As shown in FIG. 3, a rear surface of the housing 21 is provided with multiple terminal holes 25. Each of the terminal holes 25 opens in the rear surface of the housing 21, and is recessed toward the front. The terminal holes 25 are arranged side by side in the left-right direction. In the present embodiment, each of the terminal holes 25 extends from an upper half of the rear surface of the housing 21 to an upper half of the front surface of the housing 21, and opens in the upper half of the front surface.

The housing 21 is provided with a circuit board insertion hole 27. The circuit board insertion hole 27 is provided in a lower half of the front surface of the housing 21 and is recessed toward the rear. The circuit board insertion hole 27 has an opening extending in the left-right direction in the lower half of the front surface of the housing 21. The opening has a substantially rectangular shape extending in the left-right direction in front view. As shown in FIG. 1, the connector 3 and the circuit board 2 are connected to each other, with the connection part 6 of the circuit board 2 inserted into the circuit board insertion hole 27.

Figure 4:
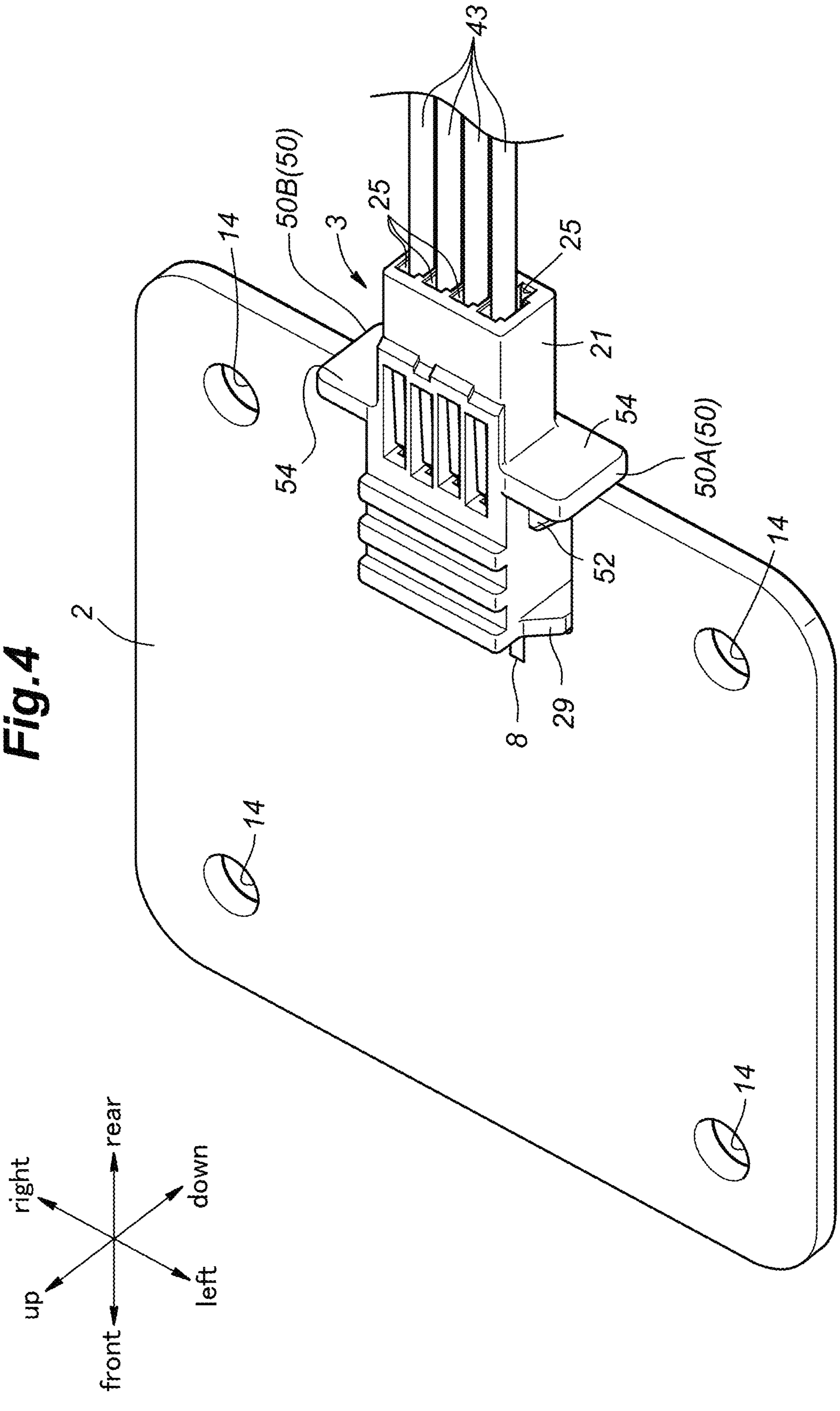
FIG. 4 is a perspective view showing a state in which the connector and the circuit board are connected in the connection structure for the connector according to the first embodiment.
Figure 5B:
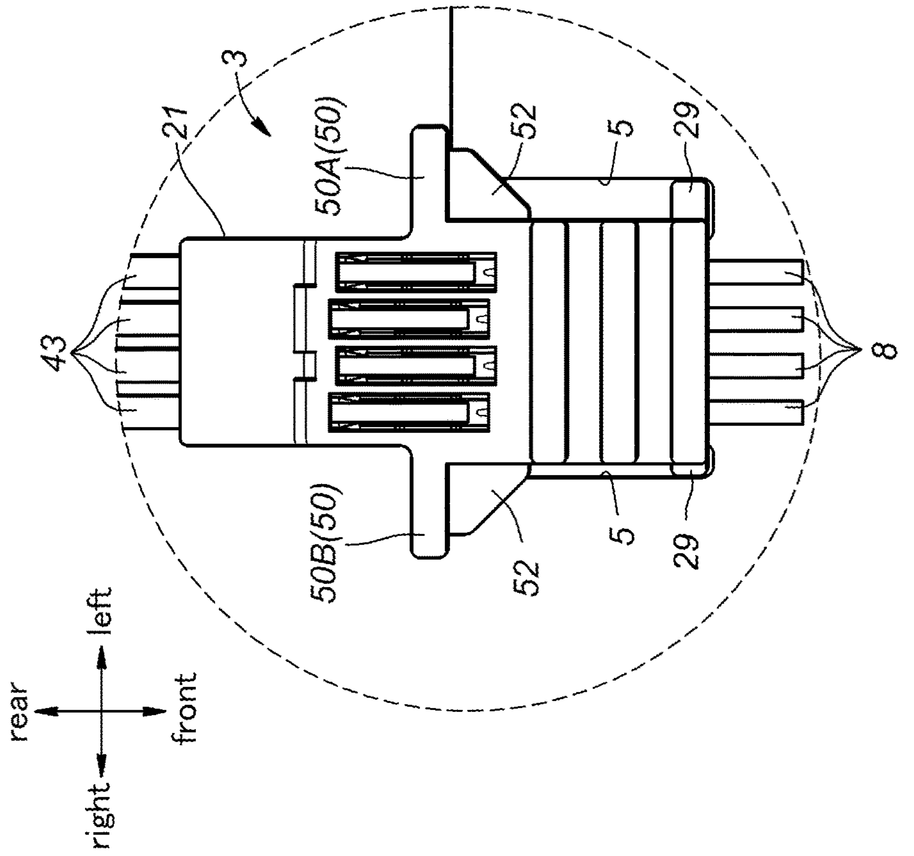
FIG. 5B is a top view when the circuit board is fully inserted in the connector.
Figure 5A:
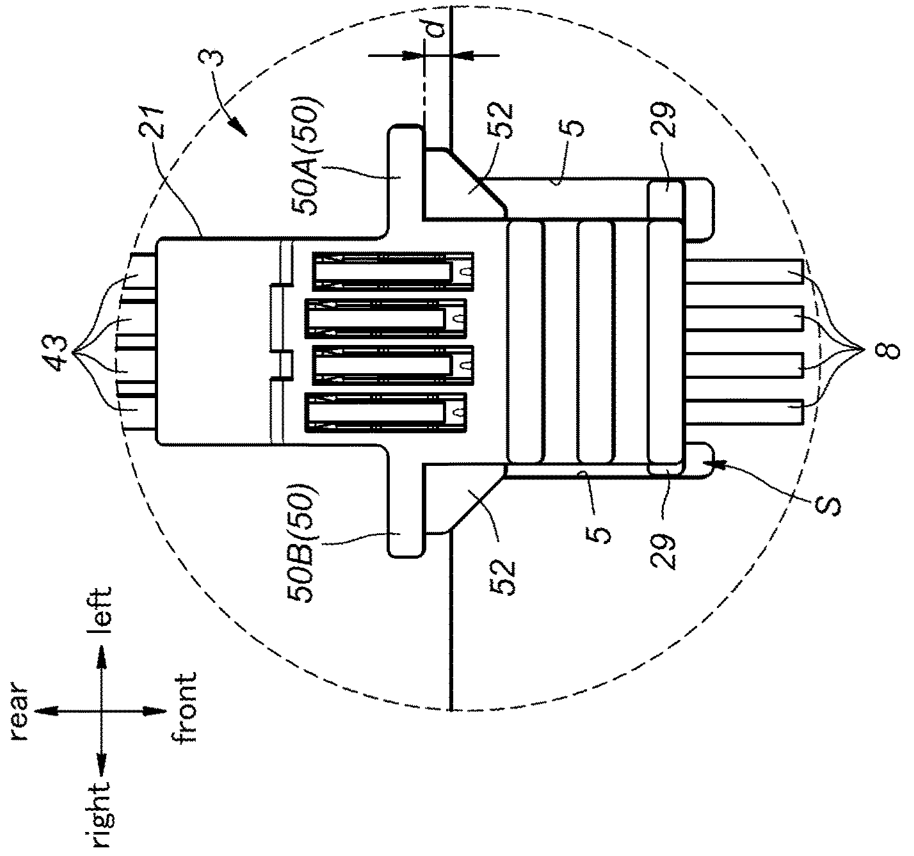
FIG. 5A is a top view when the circuit board is not fully inserted in the connector.

As shown in FIGS. 2 and 4, the front ends of the left and right side surfaces of the housing 21 are provided with respective extension parts 29 each extending out laterally outward. As shown in FIGS. 5A and 5B, the left and right extension parts 29 have different amounts of extension, which are set according the respective widths of the slits 5 in the left-right direction. Therefore, the worker cannot insert the circuit board 2 into the circuit board insertion hole 27 when the circuit board 2 is upside down. Thus, it is possible to prevent the worker from inadvertently inserting the circuit board 2 into the circuit board insertion hole 27 in the state in which the circuit board 2 is upside down. Also, as shown in FIG. 5A, the worker can visually check the insertion state of the circuit board 2 into the connector 3 from the area or presence/absence of a part S surrounded by the front end of each extension part 29 and the front portion of the corresponding slit 7.

As shown in FIG. 3, each of the terminal holes 25 is provided with a communication hole 31 connected to the circuit board insertion hole 27. The communication hole 31 is preferably provided in a front portion of each terminal hole 25.

An upper wall defining the upper edge of each terminal hole 25 is provided with a lance piece 33 for locking the corresponding terminal member 23. The lance piece 33 has a cantilever shape extending forward from an upper rear edge of the housing 21. The free end of the lance piece 33 is provided with a locking protrusion (not shown in the drawings) which protrudes downward.

Each terminal member 23 is a sheet metal member formed by bending a pressed metal plate material. The terminal member 23 includes a cable connection part 35, a casing 37 provided on the front side of the cable connection part 35, and a spring piece 39 supported by the casing 37.

The cable connection part 35 is provided with a crimp part 41 having a barrel shape. The crimp part 41 has a cylindrical shape extending in the front-rear direction. A conductor 45, which is a core wire of the cable 43, is crimped to the crimp part 41 in a state in which the conductor 45 is inserted in the inner hole of the crimp part 41. Thereby, the terminal member 23 is conductively connected to the conductor 45 of the cable 43.

The casing 37 is provided, in a front portion thereof, with a groove-shaped cross-section part 47 whose cross section which opens on the lower side has a groove shape. As shown in FIGS. 2 and 3, the groove-shaped cross-section part 47 includes a bottom wall 47A extending in the connection direction, and a left wall 47B and a right wall 47C extending along left and right side edges of the bottom wall 47A.

The bottom wall 47A forms a wall body having a surface facing in the up-down direction and extending in the front-rear direction. The bottom wall 47A is provided with a locking hole 47D penetrating therethrough in the up-down direction, and with the locking protrusion of the lance piece 33 protruding into the locking hole 47D, the terminal member 23 is locked to the housing 21, as shown in FIG. 3.

The left wall 47B and the right wall 47C have surfaces facing left and rightward, respectively, and each form a wall body extending in the front-rear direction. Each of the left wall 47B and the right wall 47C is provided, in a substantially central part thereof in the front-rear direction, with a through hole 47E penetrating therethrough in the left-right direction.

The spring piece 39 is accommodated in the groove-shaped cross-section part 47. The spring piece 39 is supported by the casing 37 by being connected, on the base end side thereof, to one of the left wall 47B, the right wall 47C, and the bottom wall 47A. The spring piece 39 extends rearward from the base end, is bent back toward the opening of the groove-shaped cross-section part 47, and further extends toward the front. The lower surface of the spring piece 39 is provided with a pressing part 39A and a contact part 39B which protrude downward. The pressing part 39A and the contact part 39B are each composed of a part embossed so as to protrude below the spring piece 39. The pressing part 39A is positioned rearward of the contact part 39B. The spring piece 39 is provided with a pair of projecting parts 39C projecting laterally outward in a position between the pressing part 39A and the contact part 39B. The projecting parts 39C project into the through hole 47E of the left wall 47B and the through hole 47E of the right wall 47C, respectively. Thereby, the spring piece 39 constitutes, in a lower portion thereof, a lever with the projecting part 39C being a fulcrum, the pressing part 39A being a point of effort, and the contact part 39B being a point of load.

The terminal members 23 are inserted in the respective terminal holes 25. The lower surface of each spring piece 39 protrudes into the circuit board insertion hole 27 through the communication hole 31. When the circuit board 2 is not inserted in the circuit board insertion hole 27, each of the pressing parts 39A is positioned inside the circuit board insertion hole 27.

Figure 6A:
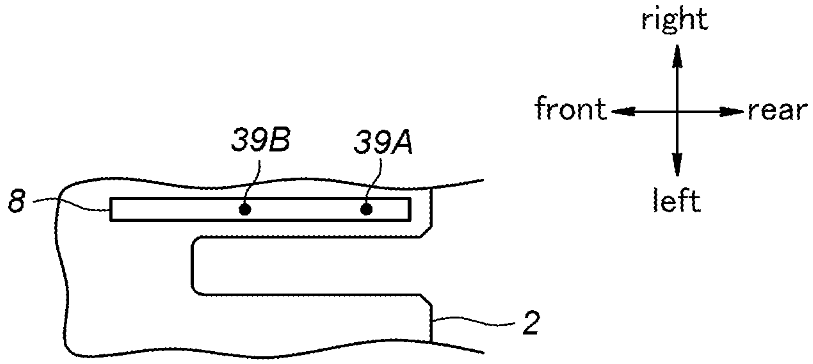
FIGS. 6A, 6B, and 6C show top views for showing the positional relationship between the terminal of the circuit board and the contact when the connector is in the full insertion position, when the connector is moved rearward from the full insertion position by an all contacts-contacting threshold value, and when the connector is moved rearward from the full insertion position by an effective mating length, respectively, wherein "P" in FIGS. 6B and 6C indicates a position of a contact part of the contact when the connector is in the full insertion position.

When the circuit board 2 is inserted in the circuit board insertion hole 27 and the circuit board 2 contacts the pressing parts 39A, the pressing parts 39A are moved toward the bottom wall 47A of the groove-shaped cross-section part 47. As a result, the contact parts 39B are moved toward the circuit board insertion hole 27, and the contact parts 39B are pushed out against the circuit board 2. FIG. 6A shows the relationship between the terminal 8 of the circuit board 2 and the positions of the contact part 39B and the pressing part 39A when the circuit board 2 is fully inserted. As shown in FIG. 6A, each of the terminal members 23 of the connector 3 contacts the corresponding terminal 8 of the circuit board 2 at the contact part 39B and the pressing part 39A. Thereby, the wiring of the circuit board 2 is electrically connected to the cables 43 respectively connected to the terminal members 23. In other words, the contact part 39B and the pressing part 39A constitute a contact of each terminal member 23.

Figure 6B:
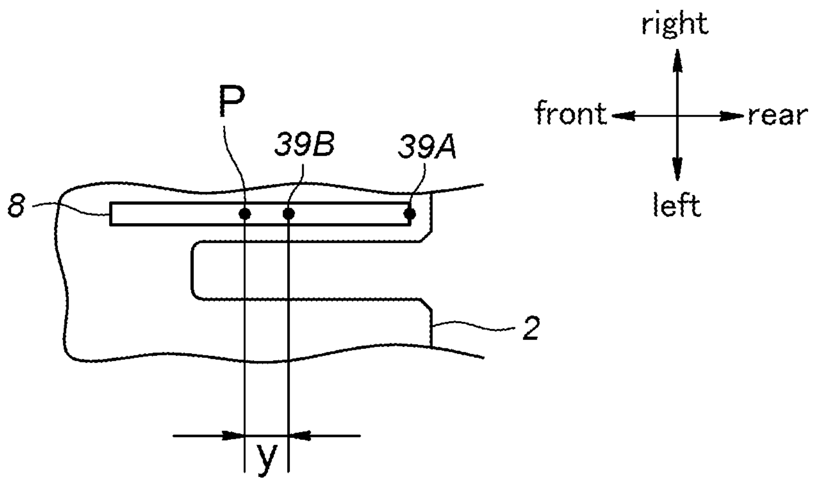
Figure 6C:
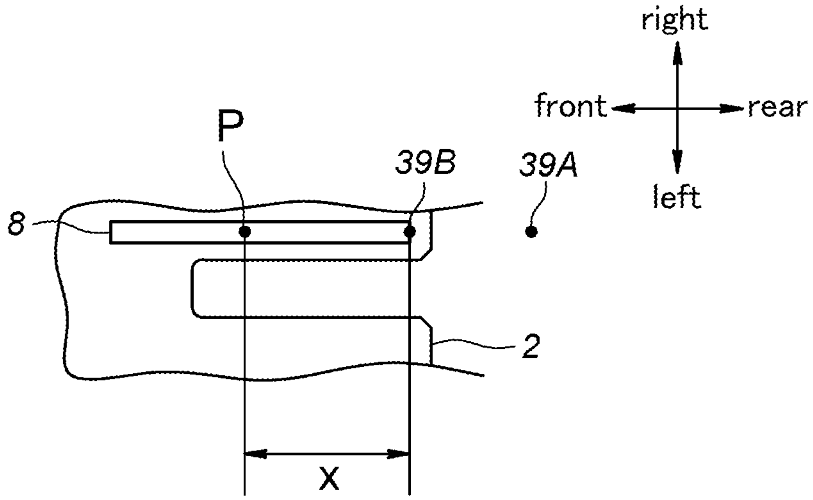

As will be understood with reference to FIGS. 6B and 6C, even when the circuit board 2 is not fully inserted into the circuit board insertion hole 27, the terminal members 23 electrically contact the circuit board 2 when an amount of shortage of the insertion depth is within a predetermined tolerance range. The amount of shortage of the insertion depth herein corresponds to the moving distance of the connector 3 in the direction separating from the circuit board 2 from the position where the circuit board 2 is fully inserted (or the moving distance of the connector 3 in the insertion direction required for the circuit board 2 to be fully inserted). This tolerance range generally corresponds to a range in which the contact between all of the terminal members 23 and the corresponding terminals 8 of the circuit board 2 is not lost (in the case where each terminal member 23 includes multiple contacts, at least one contact of the multiple contacts included in each terminal member 23 is in contact with the corresponding terminal 8), and depends on the size, position, shape, etc. of the contact of each terminal member 23 and each terminal 8 of the circuit board 2. Here, an upper limit value of the tolerance range is referred to as an effective mating length (see x in FIG. 6C).

However, in some use environment, even when the amount of shortage of the insertion depth is less than or equal to the effective mating length, the contact state between the circuit board 2 and the connector 3 may become poor due to impact, vibration, rattling, etc. applied to the circuit board 2. Therefore, to ensure certainty and reliability of the electrical connection, the amount of shortage of the insertion depth is preferably limited to be less than or equal to a threshold value (hereinafter, a tolerance threshold value) which is determined by taking into account the use environment, processing tolerance, etc. The tolerance threshold value may be set to any value greater than 0 and less than or equal to the effective mating length. Preferably, the tolerance threshold value is set to a predetermined value less than or equal to an upper limit value (see y in FIG. 6C) of the amount of shortage of the insertion depth below which all of the contacts of the terminal member 23 contact the corresponding terminals 8.

In the following, the state in which the circuit board 2 is fully inserted deep into the circuit board insertion hole 27 is referred to as a full insertion state, and the position of the connector 3 in that state is referred to as a full insertion position. Also, the position of the connector 3 when the amount of shortage of the insertion depth of the circuit board 2 is less than or equal to the effective mating length and at least one contact of each terminal member 23 is in contact with the corresponding terminal 8 of the circuit board 2 so that the connector 3 and the circuit board 2 are electrically connected is referred to as a contact position. Further, the state in which the amount of shortage of the insertion depth is greater than the effective mating length and the connector 3 and the circuit board 2 are not electrically connected is referred to as a noncontact state, and the position of the connector 3 in this state is referred to as a noncontact position. When the circuit board 2 is in the full insertion state, the circuit board 2 is in the contact state, and when the connector 3 is in the full insertion position, the connector 3 is in the contact position.

Further, a state in which the amount of shortage of the insertion depth of the circuit board 2 is less than or equal to the tolerance threshold value is referred to as a tolerance state, and the position of the connector 3 in that state is referred to as a tolerance position. The state in which the amount of shortage of the insertion depth of the circuit board 2 is greater than the tolerance threshold value is referred to as an intolerance state, and the position of the connector 3 in that state is referred to as an intolerance position.

As shown in FIG. 4, the terminal holes 25 are provided to be arranged in the left-right direction. In the present embodiment, configuration is made such that the insertion depths of the terminal members 23 change alternately in the left-right direction.

The left and right side surfaces of the housing 21 are provided, at the substantially central part thereof in the front-rear direction, with flanges 50 projecting outward to the left and right, respectively. The flanges 50 include a left flange 50A provided on the left side surface of the housing 21 and a right flange 50B provided on the right side surface of the housing 21. Each of the flanges 50 has a plate shape having surfaces facing in the front-rear direction. The front surfaces of the left flange 50A and the right flange 50B are positioned on the same plane. In the present embodiment, the housing 21 is provided with flange reinforcement pieces 52 connecting the front surfaces of the left and right flanges 50 to the corresponding left and right side surfaces of the housing 21.

As shown in FIG. 4, each of the flanges 50 is provided, on the rear surface thereof, with a pressing surface 54 facing the distal side in the connection direction (namely, the rear side). The pressing surface 54 is set to have a size that can be pressed by the worker.

As shown in FIG. 5B, when the connector 3 is in the full insertion position, the front surface (the surface on the side of the circuit board 2) of each flange 50 is parallel to a part of the rear end surface of the circuit board 2 other than the connection part 6. "Parallel" here may include a case where, as shown in FIG. 5B, the front surface of each flange 50 and the part of the rear end surface of the circuit board 2 other than the connection part 6 form straight lines parallel to each other in top view as well as a case where they form curves (for example, each may be semicircular) parallel to each other in top view (specifically, a case where one curve is apart from the other curve in the normal direction by a certain distance). Besides, they may be in any form so long as the front portion of the flange 50 has a shape matching a part of the rear portion of the circuit board 2 other than the connection part 6 but in the vicinity of the connection part 6, so that the worker can determine the degree of closeness of these portions based on the their positions.

When the connector 3 is not in the full insertion position, a distance d between the front surface of each flange 50 and the rear edge of the circuit board 2 is large compared to when the connector 3 is in the full insertion position (FIG. 5B). Therefore, the worker can easily grasp the insertion state of the circuit board 2 based on the distance d between the front surface of each flange 50 and the rear edge of the circuit board 2.

As shown in FIG. 1, in the vicinity of the left and right edges of the opening 19, the projecting wall 17 opposes the housing 21 of the connector 3 from the rear. Therefore, when the connector 3 is moved rearward, the connector 3 collides with the projecting wall 17, so that the movement of the connector 3 is limited. Specifically, the moving distance of the connector 3 in the rearward direction is limited to be less than or equal to the distance (hereinafter, the set distance) between each flange 50 and the part of the projecting wall 17 in the vicinity of the left and right edges of the opening 19 in the front-rear direction (insertion direction) when the circuit board 2 is fully inserted. Namely, the moving distance of the connector 3 from the full insertion position in the direction separating from the circuit board 2 can be suppressed to be less than or equal to the set distance, and therefore, by setting the set distance to an appropriate value, it is possible to prevent the electrical connection between the connector 3 and the circuit board 2 from being lost or the connector 3 and the circuit board 2 from being physically separated.

Specifically, in the case where the set distance is the effective mating length, the amount of rearward movement of the connector 3 from the full insertion position is suppressed to be lower than or equal to the effective mating length. This can prevent the connector 3 from moving to the noncontact position. Therefore, it is possible to prevent the electrical connection between the connector 3 and the circuit board 2 from being lost.

In the case where the set distance is the tolerance threshold value, the amount of rearward movement of the connector 3 from the full insertion position is suppressed to be lower than or equal to the tolerance threshold value. This can prevent the connector 3 from moving to the intolerance position. Therefore, the electrical connection between the connector 3 and the circuit board 2 can be prevented from being lost, and further, deterioration of the connection state between the circuit board 2 and the connector 3 can be prevented.

In the case where each terminal member 23 includes multiple contacts, the set distance may be set to a rearward moving distance of the connector 3 from the full insertion position to immediately before the contact between one contact and the terminal 8 of the circuit board 2 is lost (hereinafter referred to as an all contacts-contacting threshold value. See y in FIG. 6B). The all contacts-contacting threshold value corresponds to the upper limit value of the amount of shortage of the insertion depth, below which the all contacts of each terminal member 23 contact the corresponding terminal 8. Thereby, the all contacts of each terminal member 23 are put into contact with the terminal 8 of the circuit board 2, and thus, the electrical connection between the connector 3 and the circuit board 2 is not easily lost. In the following, the position of the connector 3 where the all contacts of each terminal member 23 are connected to the corresponding terminal 8 of the circuit board 2 is referred to as an all contacts-contacting position.

In the present embodiment, the projecting wall 17 opposes the flanges 50 in the vicinity of the left and right edges of the opening 19, and the movement of the connector 3 is restricted by the projecting wall 17 colliding with the flanges 50. However, the present invention is not limited to this embodiment, and the movement of the connector 3 may be restricted by the projecting wall 17 contacting a part of the connector 3 other than the flanges 50.

Next, assembling of the connector 3, the circuit board 2, and the holder 10 and effects of the connection structure 1 configured as above will be described.

When the worker inserts the connection part 6 of the circuit board 2 into the circuit board insertion hole 27 of the connector 3 to make them electrically connected to each other and thereafter inserts the circuit board restricting parts 15 into the through holes 14 of the circuit board 2 to make the circuit board 2 supported by the support surface 12, the circuit board 2 is assembled to the holder 10.

At this time, since the circuit board restricting parts 15 are inserted into the through holes 14 of the circuit board 2, the circuit board restricting parts 15 restrict the movement of the circuit board 2 in the direction separating from the connector 3 (forward movement).

Also, at this time, the projecting wall 17 opposes the flanges 50 from the rear, whereby the rearward movement of the connector 3 relative to the circuit board 2 and the holder 10 is restricted. The projecting wall 17 engages with the connector 3 electrically connected to the circuit board 2, and functions as, so to speak, a connector restricting part which restricts the movement of the connector 3 in the direction separating from the circuit board 2.

Since the circuit board restricting parts 15 restrict the movement of the circuit board 2 in the direction separating from the connector 3 and the projecting wall 17 restricts the movement of the connector 3 in the direction separating from the circuit board 2, the circuit board 2 and the connector 3 are hard to be separate. Therefore, the separation of the circuit board 2 and the connector 3 can be prevented without providing the connector 3 with claws or the like for engaging with cutouts or through holes of the circuit board 2.

Figure 7A:
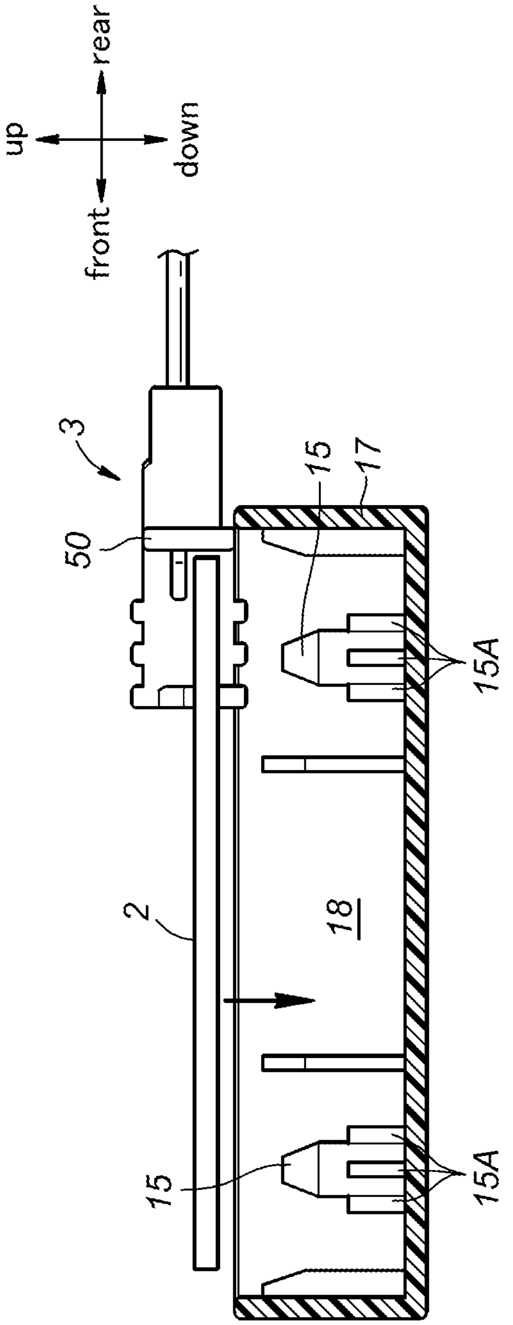
FIGS. 7A and 7B show side sectional views when the connector is not in the tolerance position and when the connector is in the tolerance position, respectively, when the circuit board is inserted into the holder in the connector structure according to the first embodiment.
Figure 7B:
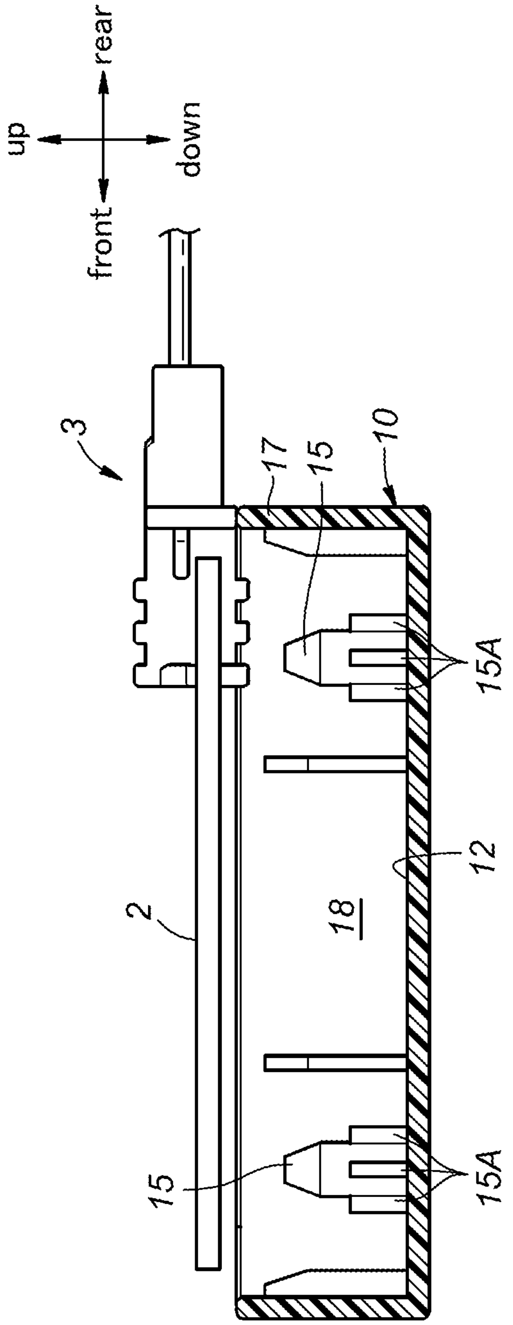

As shown by an arrow in FIG. 7A, when the moving distance of the connector 3 from the full insertion position in the direction separating from the circuit board 2 is less than or equal to the set distance, the projecting wall 17 does not collide with the flanges 50 when the circuit board 2 is moved downward toward the support surface 12, and thus, the circuit board 2 can be assembled to the holder 10. On the other hand, as shown in FIG. 7B, when the moving distance of the connector 3 from the full insertion position in the direction separating from the circuit board 2 is greater than the set distance, the projecting wall 17 collides with the flanges 50. Therefore, the movement of the circuit board 2 toward the support surface 12 (namely, the downward movement) is obstructed, and support on the support surface 12 of the holder 10 is prohibited. Namely, when the amount of shortage of the insertion amount of the connector 3 is greater than the set distance, it is possible to prohibit the holder 10 from supporting the circuit board 2.

For example, in the case where the set distance is the effective mating length, it is possible to prohibit the circuit board 2 from being supported by the support surface 12 of the holder 10 when the amount of shortage of the insertion amount of the connector 3 is greater than the effective mating length, namely, when the connector 3 is in the noncontact state. Therefore, it is possible to prevent the circuit board 2 from being assembled to the holder 10 and used though the connector 3 is not electrically connected to the circuit board 2.

In the case where the set distance is the tolerance threshold value, it is possible to prohibit the circuit board 2 from being supported by the support surface 12 of the holder 10 when the amount of shortage of the insertion amount of the connector 3 is greater than the tolerance threshold value, namely, when the connector 3 is in the intolerance state. Therefore, it is possible to prevent the circuit board 2 from being assembled to the holder 10 and used though the electrical connection between the connector 3 and the circuit board 2 may be lost during use.

In the case where the set distance is the all contacts-contacting threshold value, it is possible to prohibit the circuit board 2 from being supported by the support surface 12 of the holder 10 when the connector 3 is not in the all contacts-contacting position. Therefore, it is possible to prevent the circuit board 2 from being assembled to the holder 10 and used though not all of the contacts are in contact with the corresponding terminals 8 of the circuit board 2.

Also, when the worker pulls out the circuit board 2 upward from the holder 10 and pulls out the circuit board 2 from the circuit board insertion hole 27, the electrical connection between the connector 3 and the circuit board 2 is disconnected, and the connector 3 and the circuit board 2 are separated. When the worker inserts the connection part 6 of the circuit board 2 into the circuit board insertion hole 27, the circuit board 2 and the connector 3 are electrically connected. Thus, the circuit board 2 and the connector 3 are insertable/removable, and can be joined to and separated from each other.

As shown in FIG. 4, the flanges 50 are each provided with a pressing surface 54 facing the distal side in the connection direction, namely, the rear side. When the circuit board 2 is not fully inserted into the connector 3, by pressing the pressing surfaces 54, the worker can apply a load to move the connector 3 closer to the circuit board 2. Thereby, it is possible to push out the connector 3 toward the circuit board 2 to insert the circuit board 2 into the connector 3.

As shown in FIGS. 5A and 5B, the front surface of each flange 50 is parallel to the rear edge (namely, the edge part on the side of the connection part 6) of the circuit board 2. As a result, based on the distance d between the front surface of each flange 50 and the rear edge of the circuit board 2, the worker can visually check the amount of shortage of the insertion amount of the circuit board 2 into the connector 3, and can easily grasp the joining state between the circuit board 2 and the connector 3.

The terminals 8 of the circuit board 2 are provided to extend in the front-rear direction. Therefore, the positional range in which the connector 3 can be electrically connected to the circuit board 2 extends in the connection direction, whereby the electrical connection between the connector 3 and the circuit board 2 becomes easy to be obtained. In the present embodiment, the terminal member 23 and the terminal 8 of the circuit board 2 are electrically connected when one of the pressing part 39A and the contact part 39B contacts the terminal 8 of the circuit board 2, and therefore, the electrical connection between the connector 3 and the circuit board 2 is even easier to be obtained.

Second Embodiment

A connection structure 101 according to the second embodiment differs from the connection structure 1 according to the first embodiment with respect to the structure of a holder 102, and the other structure is the same as the first embodiment. Therefore, the description of the other structure will be omitted, and the structure of the holder 102 will be described in the following.

Figures 8A, 8B:
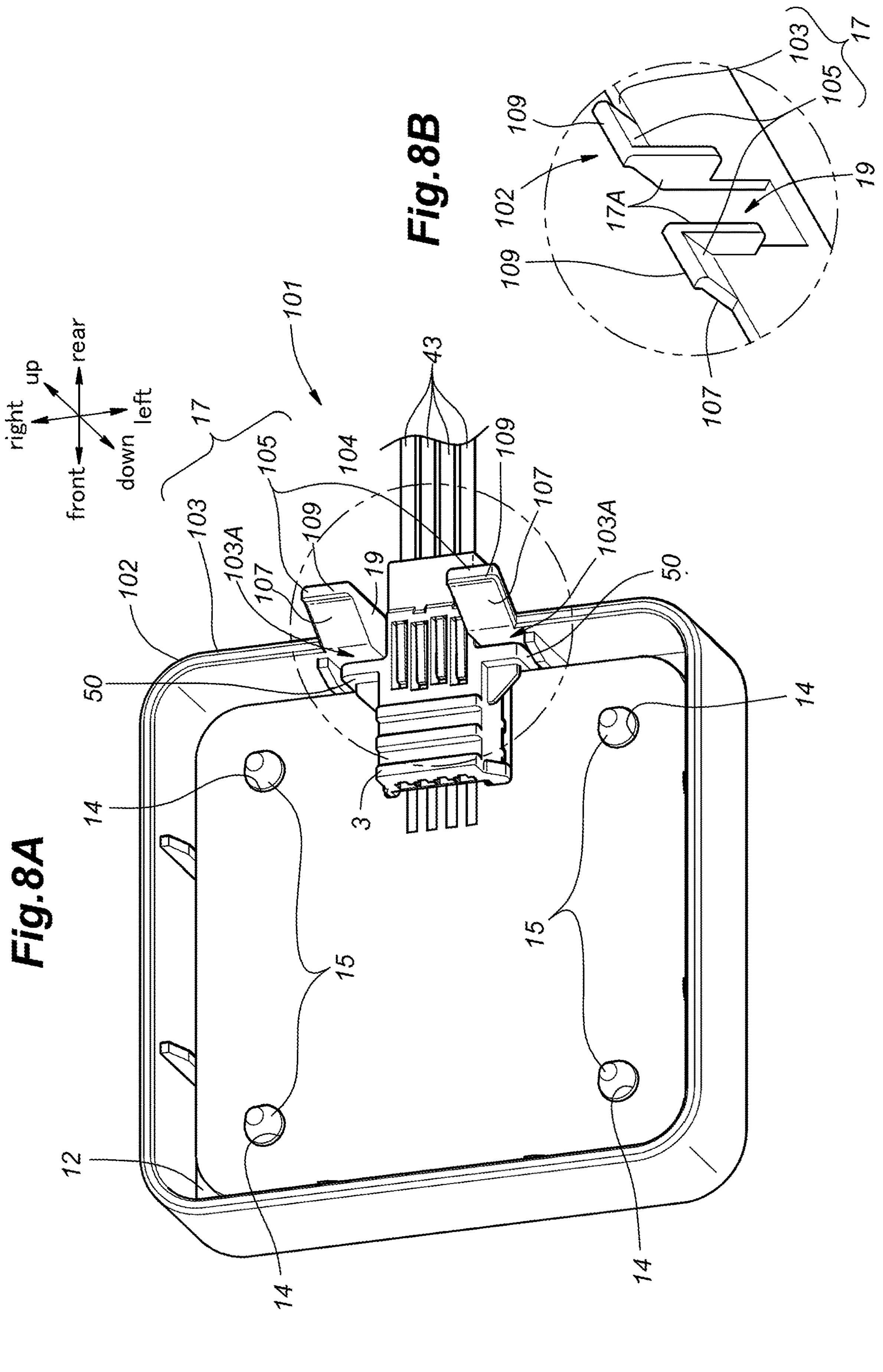
FIG. 8A is a perspective view showing an assembled state of the connector, the circuit board, and the holder regarding the connection structure for the connector according to the second embodiment.
FIG. 8B is a perspective view of a vicinity of a projecting piece of the holder (a part of the holder surrounded by a two-dot chain line circle in FIG. 8A) as seen from the rear.

As shown in FIG. 8A, similarly to the first embodiment, the holder 102 is provided with a horizontal support surface 12 on the upper side thereof. Similarly to the first embodiment, the support surface 12 is provided with circuit board restricting parts 15. The circuit board restricting parts 15 restrict the forward movement of the circuit board 2 supported on the support surface 12 (in the present embodiment, rearward and left-right directions are also included). In the present embodiment, the circuit board restricting parts 15 are formed in a cylindrical columnar shape protruding from the support surface 12. The circuit board restricting parts 15 protrude into the through holes 14 of the circuit board 2 and restrict the movement of the circuit board 2 in the horizontal direction, including the forward movement.

The support surface 12 is provided with a projecting wall 17. The projecting wall 17 is a wall body projecting from the support surface 12 and extends so as to surround the circuit board 2. The projecting wall 17 includes a tubular peripheral wall 103 surrounding the circuit board 2 and an extension wall 105 connected to an upper end of the peripheral wall 103. The peripheral wall 103 and the extension wall 105 are each provided with an opening 19 in a position corresponding to the connection part 6 of the circuit board 2.

The connector 3 connected to the circuit board 2 is passed through the opening 19. At this time, the flanges 50 are positioned in front of the parts of the peripheral wall 103 defining the left and right edges of the opening 19 (hereinafter referred to as the opening edge parts 103A). When the connector 3 is moved rearward, the flanges 50 contact the opening edge parts 103A of the peripheral wall 103, and the rearward movement of the connector 3 is restricted.

The extension wall 105 is provided, on the front surface thereof, with a slope 107 that is inclined obliquely upward toward the rear. In other words, the projecting wall 17 is provided with the slope 107 that is inclined toward the circuit board 2 as approaching the support surface 12. A part of the front surface of the extension wall 105 positioned to the left of the opening 19 and a part of the front surface of the extension wall 105 positioned to the right of the opening 19 are positioned on the same plane. The extension wall 105 forms a wall body extending obliquely upward toward the rear.

As shown in FIG. 8B, the projecting wall 17 is preferably provided with reinforcement walls 17A extending rearward from left and right edge parts of the opening 19. At least a part of each reinforcement wall 17A is connected to the extension wall 105 at the front end thereof. In the present embodiment, the reinforcement wall 17A is connected, at the front end thereof, to a part from the upper end to the lower end of the extension wall 105 and a part from the upper end to the substantially central part of the peripheral wall 103.

In the present embodiment, the upper end of the extension wall 105 is provided with vertical walls 109. Each vertical wall 109 extends upward from the upper end of the extension wall 105. The front surface of the vertical wall 109 extends in the up-down direction and faces forward. The lower end of the front surface of the vertical wall 109 is connected to the upper end of the front surface of the extension wall 105.

Figure 9A:
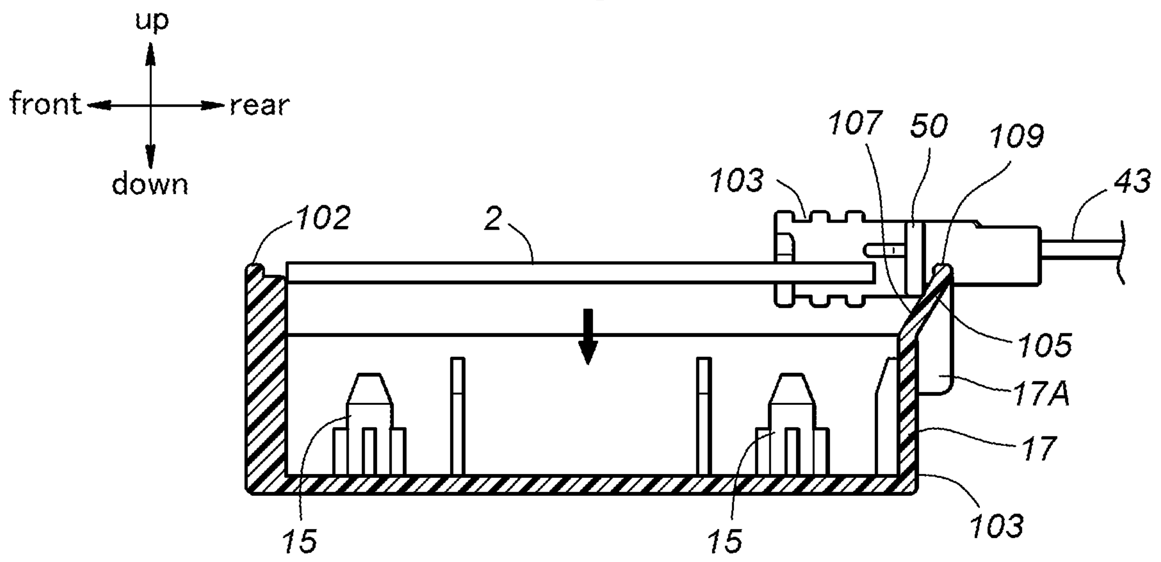
FIGS. 9A, 9B, 9C, and 9D are an explanatory diagrams showing states of the connection structure for the connector according to the second embodiment before the circuit board is accommodated in the holder, when the circuit board is lowered with the connector being guided along the slope, when the guiding is completed, and when the circuit board is fixed.
Figure 9B:
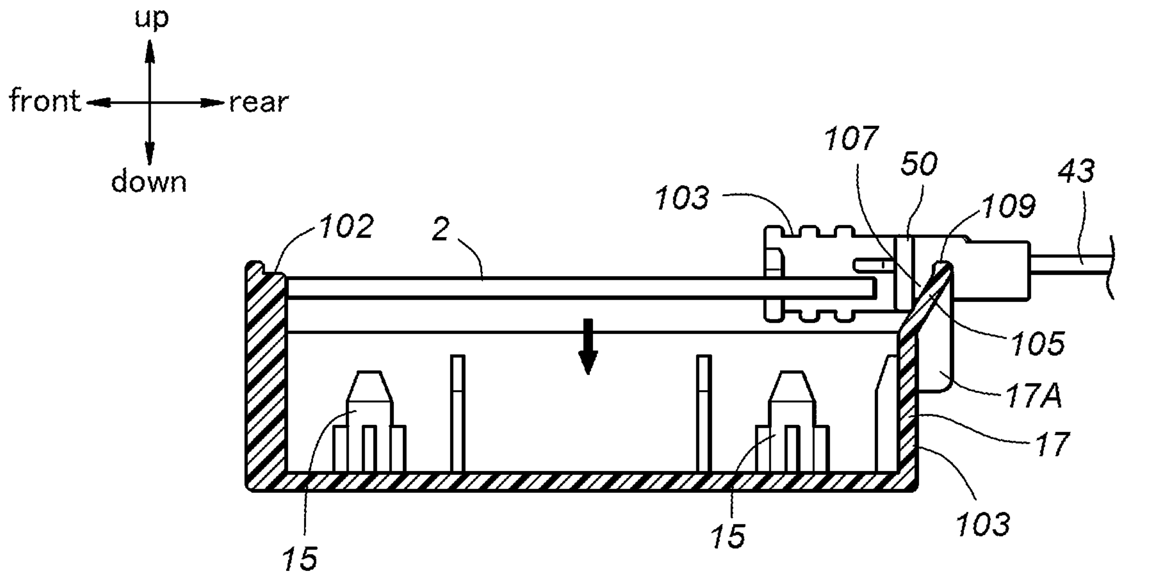
Figure 9C:
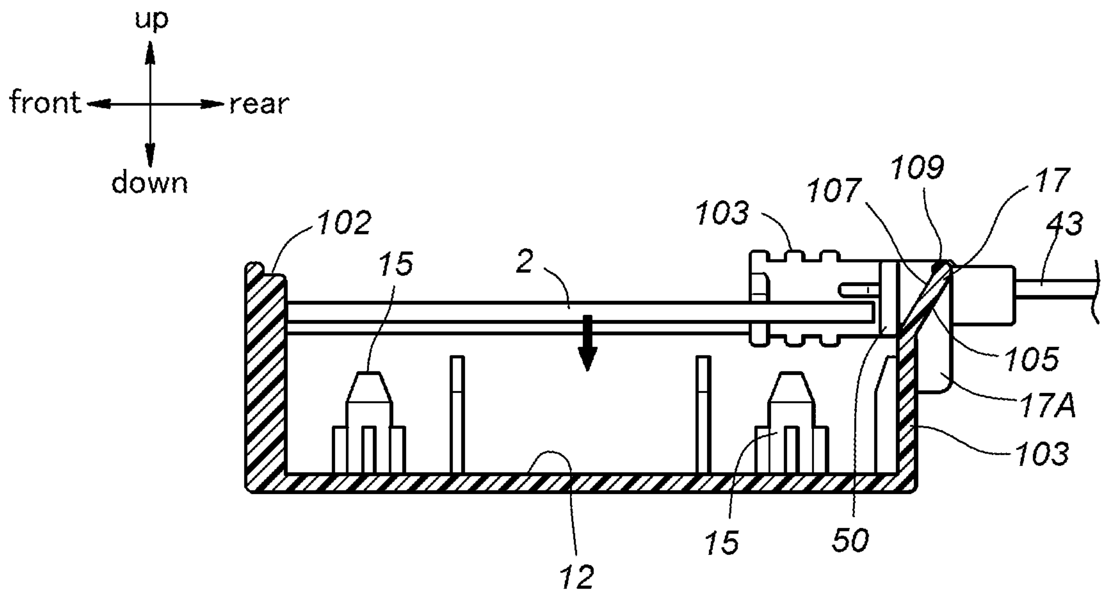
Figure 9D:
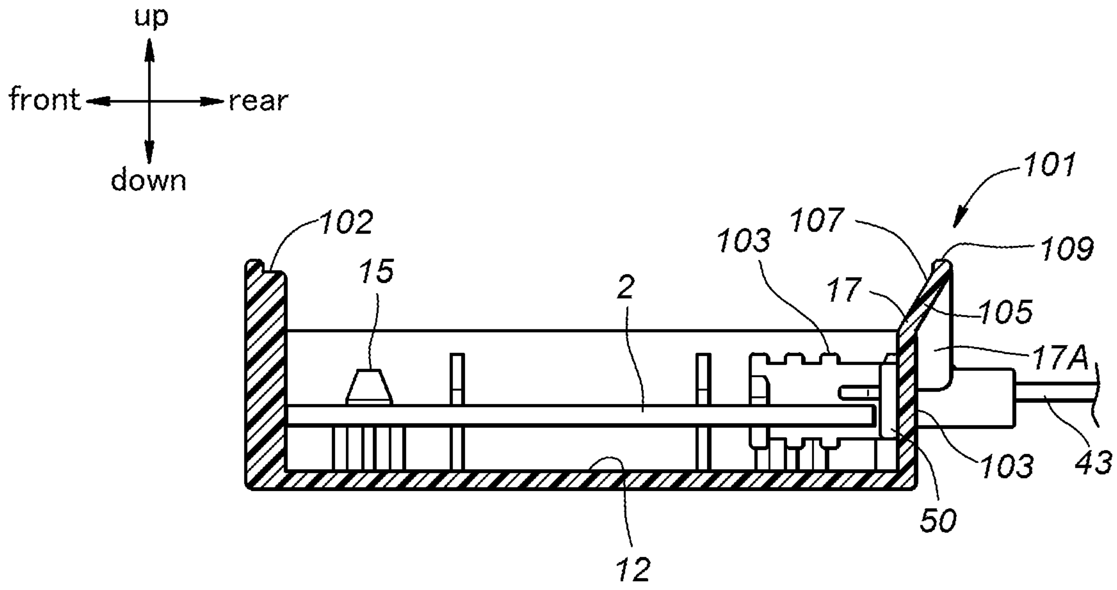

Next, effects of the connection structure 101 configured as above will be described. As shown in FIGS. 8A and 9D, when the circuit board 2 is assembled to the holder 102, the circuit board restricting parts 15 restrict the movement of the circuit board 2 in the direction separating from the connector 3 (forward direction), and the projecting wall 17 restricts the movement of the connector 3 in the direction separating from the circuit board 2 (rearward direction). Therefore, the circuit board 2 and the connector 3 are hard to be separated, and electrical connection between the circuit board 2 and the connector 3 is not easily lost.

When assembling the circuit board 2 to the holder 102, the worker first inserts the circuit board 2 into the circuit board insertion hole 27 of the connector 3. Thereafter, to make the circuit board 2 held on the support surface 12, the worker moves the circuit board 2 closer to the support surface 12 and inserts the circuit board restricting parts 15 into the through holes 14 so that the circuit board 2 is supported on the support surface 12.

There may be a case where the insertion of the circuit board 2 into the circuit board insertion hole 27 is insufficient, and the amount of shortage of the insertion amount is greater than the set distance. In this case, when the worker holds the circuit board 2 and moves it downward toward the support surface 12 (FIG. 9A), the flanges 50 come into contact with the slope 107 (FIG. 9B), and the flanges 50 are pushed out toward the circuit board 2 by the slope 107. As a result, the connector 3 is pushed out forward and is guided to move closer to the circuit board 2. Thereby, the amount of shortage of the insertion amount becomes less than or equal to the set distance (FIG. 9C).

Thus, in the case where the set distance is the effective mating length, when the amount of shortage of the insertion amount is greater than the effective mating length, it is possible to push out the connector 3 forward to make the amount of shortage of the insertion amount equal to the effective mating length. Thus, the connector 3 can be brought to the contact position.

Similarly, in the case where the set distance is the tolerance threshold value, the connector 3 can be brought to the tolerance position. Also, in the case where the set distance is the all contacts-contacting threshold value, the connector 3 can be brought to the all contacts-contacting position.

Further, when the flanges 50 contact the slope 107, the reinforcement walls 17A resist the load from above. Thereby, it is ensured that the projecting wall 17 has sufficient stiffness for guiding the connector 3.

Further, the upper end of the extension wall 105 is provided with the vertical walls 109. Therefore, when the worker holds the circuit board 2 and moves it downward, the vertical walls 109 prevent rearward movement of the flanges 50, whereby the flanges 50 are guided to effectively move toward the extension wall 105.

Also, when assembling the circuit board 2 to the holder 102, the load applied from the slope 107 to the flanges 50 may become uneven between left and right. When assembling the circuit board 2 to the holder 102, a rear portion of the connector 3 is positioned between the left and right reinforcement walls 17A, and the moving direction thereof is restricted to the up-down direction. Therefore, rotation of the connector 3 can be prevented, and the connector 3 can be guided to move downward.

Third Embodiment

A connection structure 201 according to the third embodiment differs from the connection structure 1 according to the first embodiment with respect to the structure of a holder 202, and the other structure is the same as the first embodiment. Therefore, description of the other structure will be omitted, and the structure of the holder 202 according to the second embodiment will be described.

Figure 10:
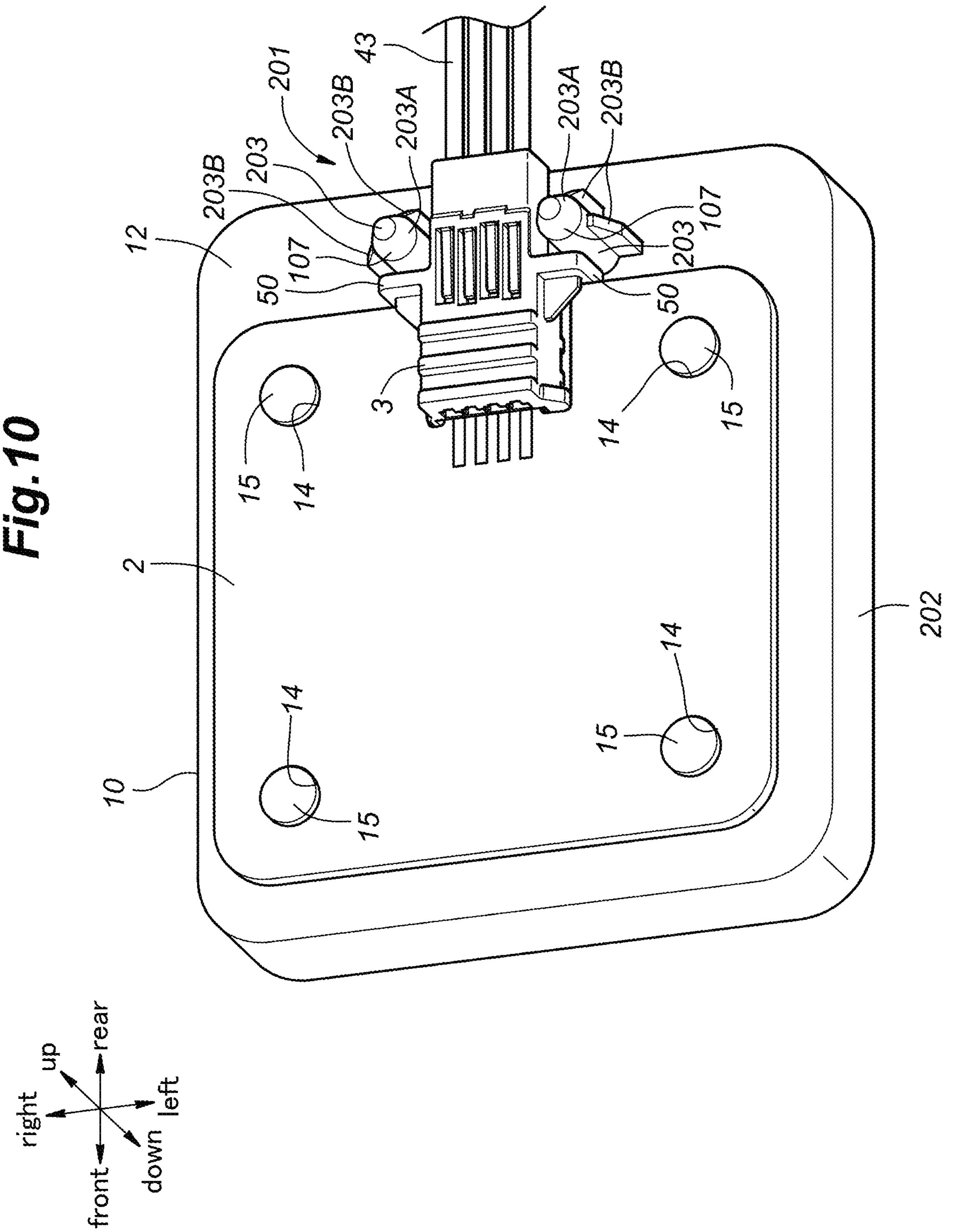
FIG. 10 is a perspective view showing a state of the connection structure for the connector according to the third embodiment, in which the connector and the circuit board are connected, and the circuit board is held in the holder.

As shown in FIG. 10, similarly to the first embodiment, the holder 202 according to the third embodiment is provided with a horizontal support surface 12 on the upper side thereof. The support surface 12 is protrudingly provided with circuit board restricting parts 15 having a cylindrical columnar shape as in the first embodiment. The circuit board 2 is placed on the support surface 12 such that the circuit board restricting parts 15 are inserted into the through holes 14, whereby the circuit board 2 is supported by the holder 202. With the circuit board restricting parts 15 inserted into the through holes 14, the movement of the circuit board 2 in the front-rear and left-right directions, including the direction separating from the connector 3 (namely, the forward direction), is restricted. The connector 3 similar to that of the first embodiment is connected to the connection part 6 of the circuit board 2.

On the upper surface of the holder 202, two projecting pieces 203 are protrudingly provided. The two projecting pieces 203 laterally oppose each other via the connector 3 connected to the circuit board 2. The projecting pieces 203 are respectively positioned rearward of the flanges 50. Each of the projecting pieces 203 includes a projecting piece main part 203A projecting from the support surface 12, and multiple projecting piece reinforcement parts 203B for connecting the outer circumferential surface of the projecting piece main part 203A to the support surface 12. The projecting piece main part 203A has a substantially cylindrical columnar shape projecting from the support surface 12. The tip of the projecting piece main part 203A is tapered toward the top. Thus, a slope 107 that is inclined rearward toward the top is provided on the front side of the upper portion of the projecting piece main part 203A. The projecting piece reinforcement parts 203B are provided on the rear surface and the left and right outer surfaces of the projecting piece main part 203A, respectively. Each projecting piece reinforcement part 203B has a rib shape extending vertically, and is connected to the support surface 12 at the lower end thereof.

When the connector 3 is moved rearward, the connector 3 comes into contact with the projecting pieces 203 at the flanges 50. Therefore, the movement of the connector 3 in the rearward direction, namely, the movement in the direction separating from the circuit board 2, is restricted. In other words, each projecting pieces 203 functions as a connector restricting part that restricts the movement of the connector 3 in the direction separating from the circuit board 2.

Next, effects of the connection structure 201 configured as above will be described. When the circuit board 2 is assembled to the holder 202, the circuit board restricting parts 15 restrict the movement of the circuit board 2 in the direction separating from the connector 3 (forward direction), and the projecting pieces 203 restrict the movement of the connector 3 in the direction separating from the circuit board 2 (rearward direction). Therefore, the circuit board 2 and the connector 3 are hard to be separated, and electrical connection is not easily lost.

Fourth Embodiment

A connection structure 301 according to the fourth embodiment differs from the connection structure 201 according to the third embodiment with respect to only the structure of the connector 3, and the other structure is the same as the third embodiment. Therefore, description of the other structure will be omitted, and the structure of the connector 3 according to the third embodiment will be described.

Figure 11A:
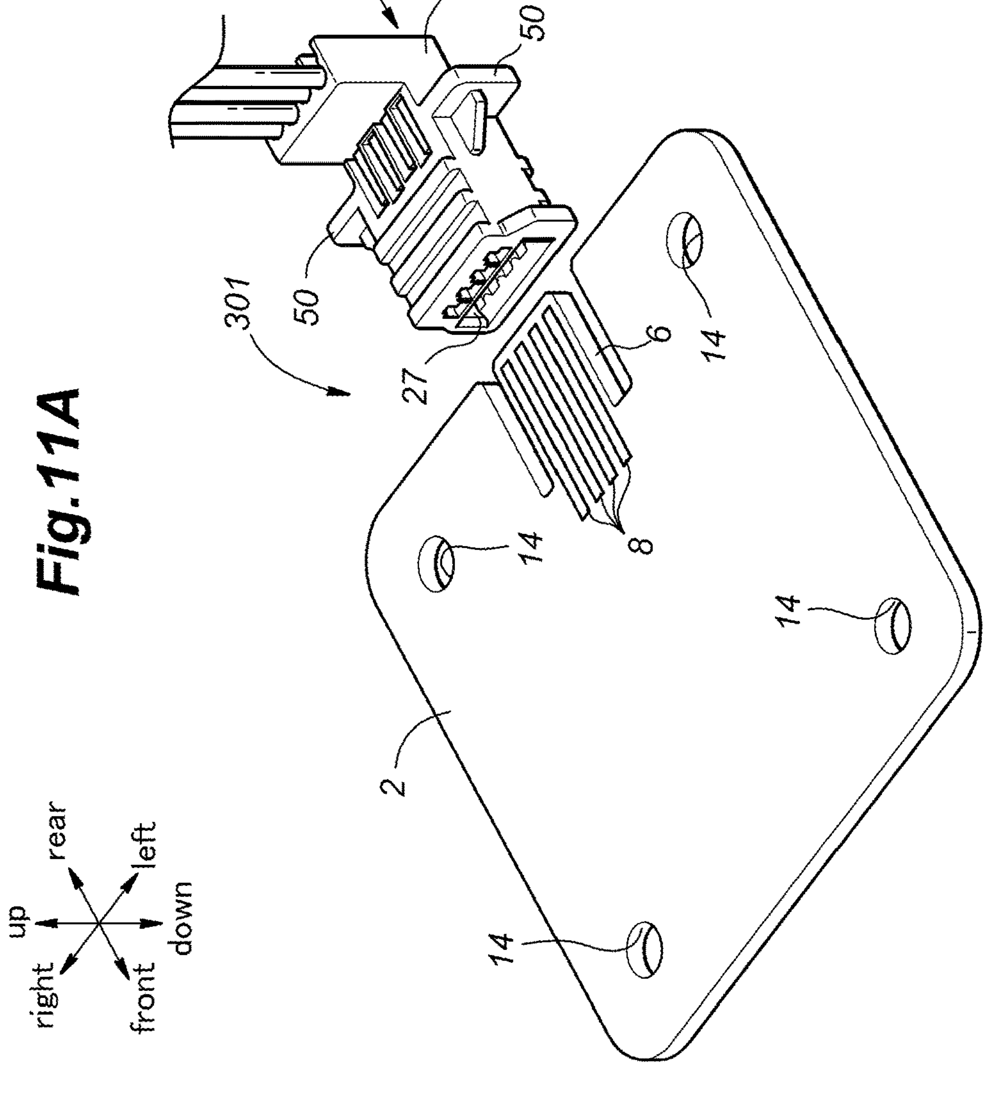
FIG. 11A is a perspective view of the circuit board and the connector of the connection structure for the connector according to the fourth embodiment.
Figure 11B:
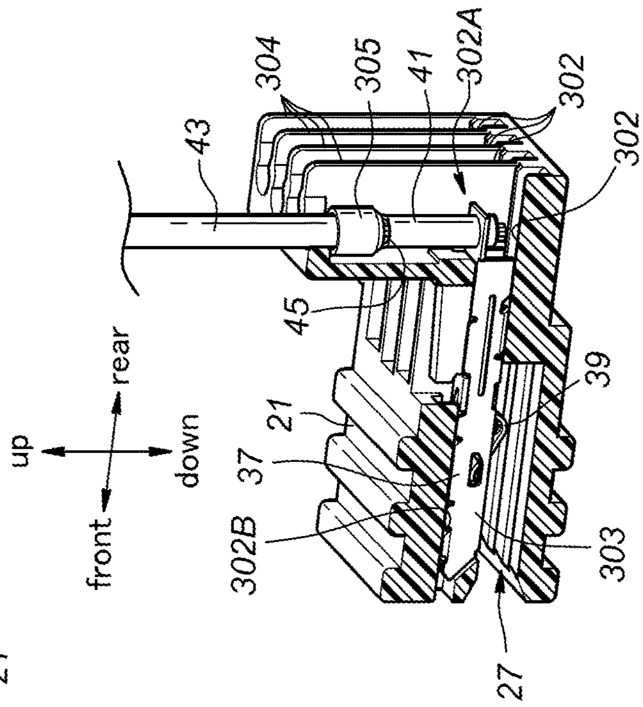
FIG. 11B is a perspective sectional view of the connector.

As in the first embodiment, the connector 3 is provided with a housing 21 (see FIG. 11A) and multiple terminal members 23 (see FIG. 11B).

As shown in FIG. 11A, the housing 21 forms an L shape which extends downward and then forward in side view. As shown in FIG. 11B, the housing 21 is provided with a circuit board insertion hole 27 which, as in the first embodiment, is recessed from front to rear, and multiple terminal holes 302 having a shape different from the first embodiment. The terminal holes 302 are recessed parts provided in the housing 21, and terminal members 303 having a shape different from the first embodiment are accommodated therein, respectively.

Each of the terminal holes 302 includes a terminal hole main part 302A extending downward from an upper surface of a rear portion of the housing 21, and a terminal hole front part 302B extending forward from the lower end of the terminal hole main part 302A. The terminal hole front parts 302B of the terminal holes 302 are positioned above the circuit board insertion hole 27 and, similarly to the first embodiment, are each in communication with the circuit board insertion hole 27 at the lower portion thereof. The terminal hole main parts 302A are separated by partition walls 304 each having surfaces facing in the left-right direction. Each of the terminal hole main parts 302A opens toward the rear.

Each terminal member 303 forms an L shape which extends downward and then forward in side view. Similarly to the first embodiment, the terminal member 303 is provided with a cable connection part 305, a casing 37 provided on the front side of the cable connection part 305 and extending in the front-rear direction, and a spring piece 39 supported by the casing 37. The casing 37 and the spring piece 39 are similar to those of the first embodiment, while the structure of the cable connection part 305 differs from the first embodiment.

The cable connection part 305 is connected to the rear end of the casing 37 and extends upward. A substantially central part of the cable connection part 305 in the up-down direction is provided with a tubular crimp part 41, and the conductor 45 of the cable 43 is crimped to the crimp part 41. Thereby, the terminal member 303 is conductively connected to the conductor 45 of the cable 43.

The terminal member 303 is accommodated and fixed in the terminal hole 302 of the housing 21, with the casing 37 and the spring piece 39 accommodated in the terminal hole front part 302B of the terminal hole 302 and the cable connection part 305 accommodated in the terminal hole main part 302A. The cable 43 connected to the cable connection part 305 extends upward from the upper end of the rear portion of the housing 21. The rear surface of the partition wall 304 is positioned rearward of the cable connection part 305.

Figure 12:
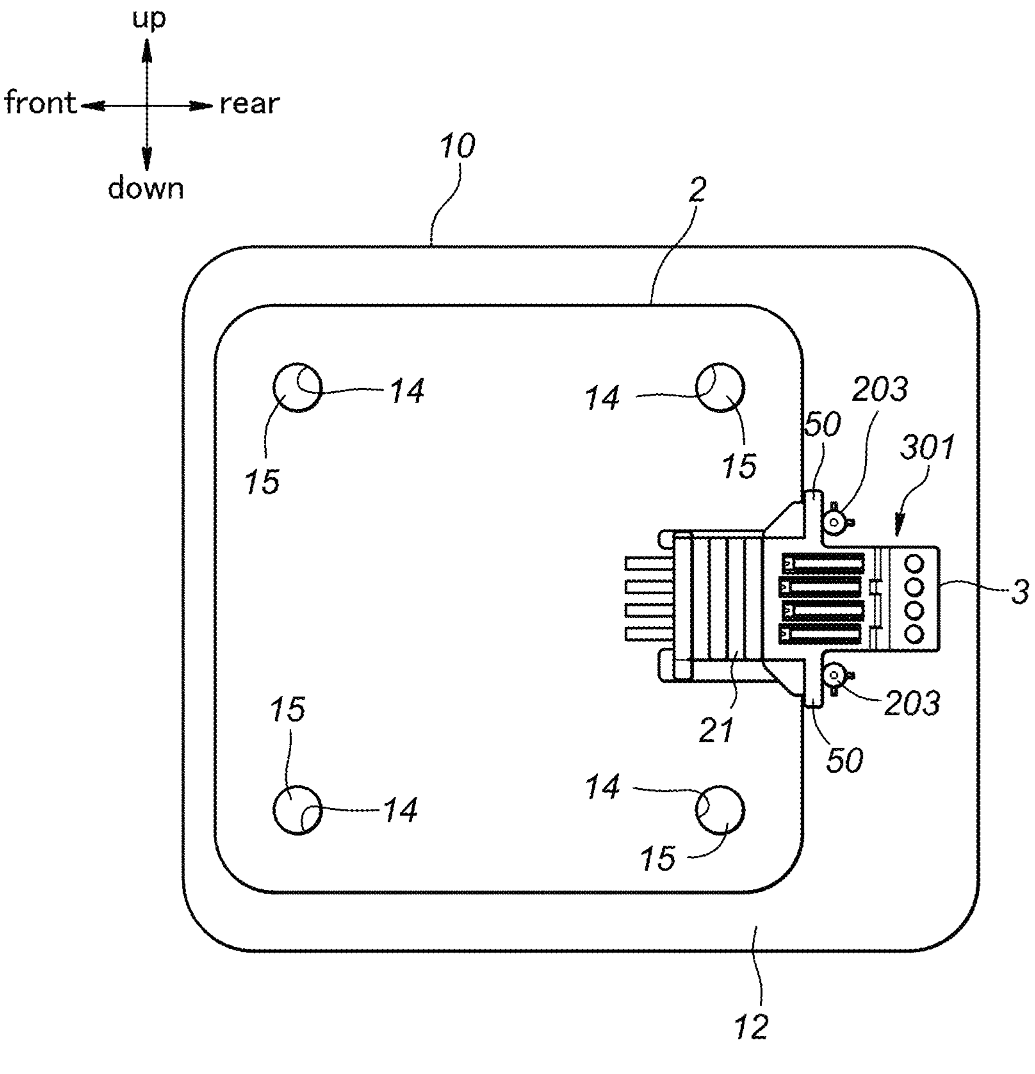
FIG. 12 is a top view showing a state of the connection structure for the connector according to the fourth embodiment, in which the connector and the circuit board are connected, and the circuit board is held in the holder.

As shown in FIG. 12, as in the third embodiment, the circuit board 2 is mounted to the holder 10 in the state in which the circuit board restricting parts 15 are inserted in the through holes 14 of the circuit board 2. As in the second embodiment, the holder 10 is provided with two projecting pieces 203 arranged left and right. The projecting pieces 203 are respectively positioned rearward of the flanges 50 of the connector 3 joined and electrically connected to the circuit board 2.

Next, effects of the connection structure 301 configured as above will be described. As in the second embodiment, the circuit board restricting parts 15 protrude into the through holes 14 of the circuit board 2, whereby the forward movement of the circuit board 2 is restricted. Also, the projecting pieces 203 provided on the holder 10 contact the flanges 50 of the connector 3, whereby the rearward movement of the connector 3 is restricted. Therefore, each of the movement of the circuit board 2 in the direction separating from the connector 3 and the movement of the connector 3 in the direction separating from the circuit board 2 is restricted, so that the separation of the circuit board 2 and the connector 3 is prevented.

Similarly to the first embodiment, when the circuit board 2 is not fully inserted into the connector 3, the worker can move the connector 3 to the full insertion position by pressing forward the pressing surfaces 54 of the flanges 50. Further, the worker can also move the connector 3 to the full insertion position by pressing forward the rear end surfaces of the partition walls 304. In this way, the surface to be pressed to properly connect the connector 3 to the circuit board 2 becomes larger than in the second embodiment, and thus, the workability of assembling the connector 3 to the circuit board 2 improves.

Fifth Embodiment

A connection structure 401 according to the fifth embodiment differs from the connection structure 301 according to the fourth embodiment with respect to only the structure of the connector 3, and the other structure is the same as the third embodiment. Therefore, description of the other structure will be omitted, and the structure of the connector 3 according to the third embodiment will be described.

Figure 13B:
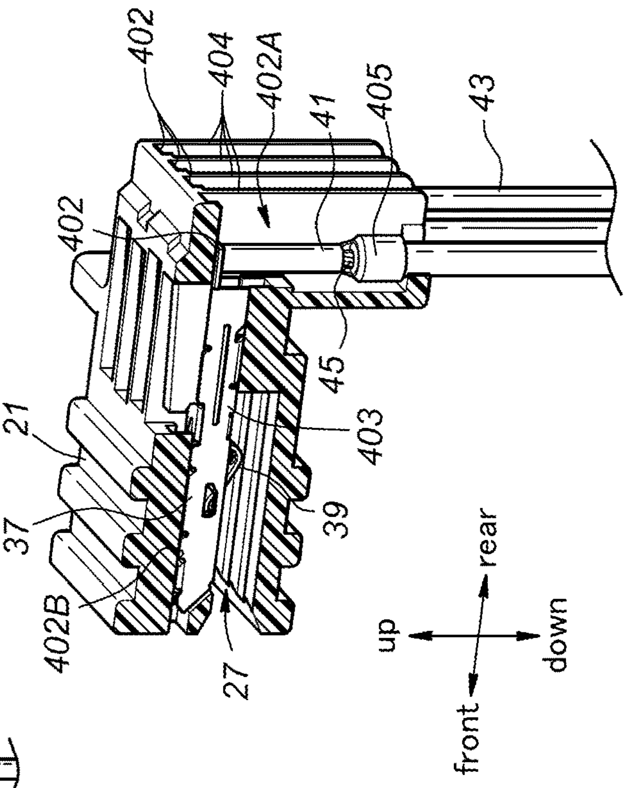
FIG. 13B is a perspective sectional view of the connector.
Figure 13A:
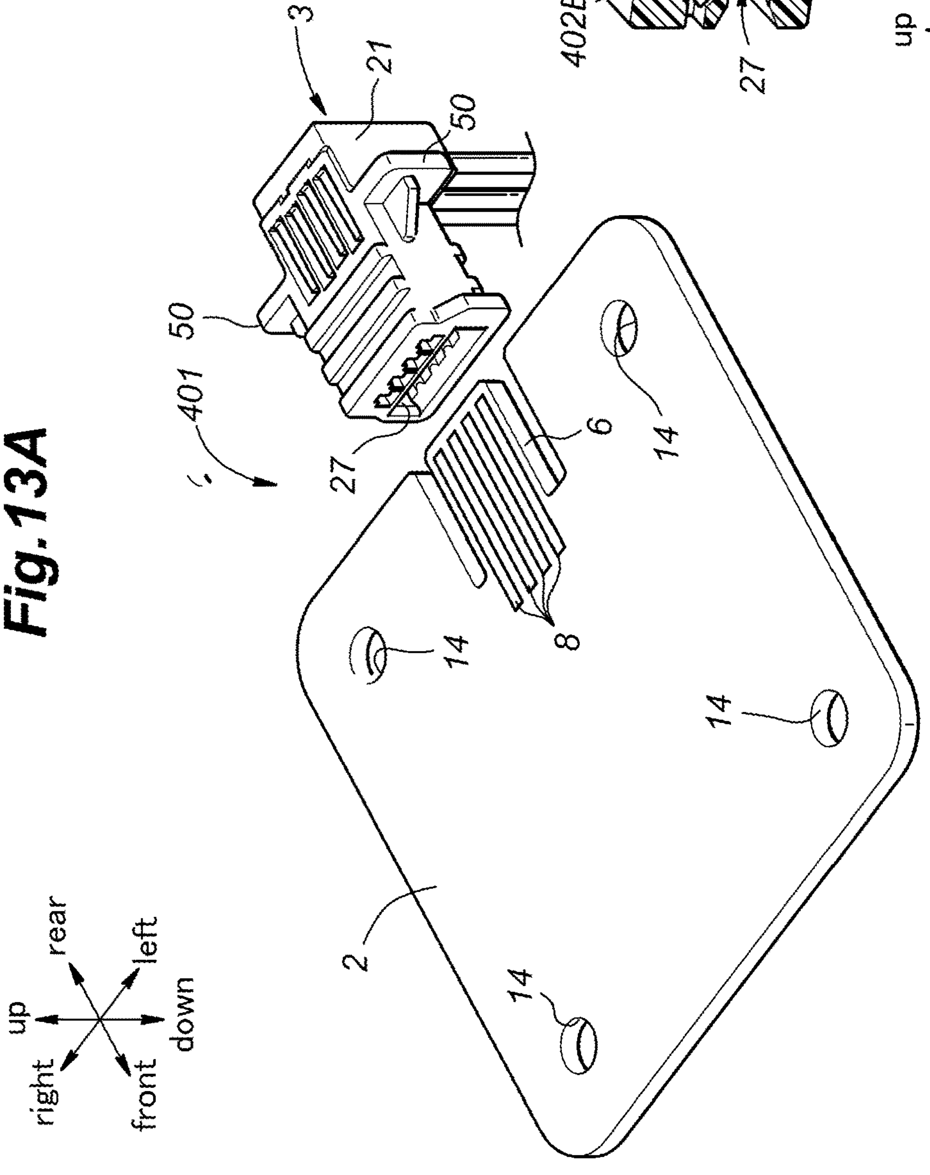
FIG. 13A is a perspective view of the connector and the circuit board of the connection structure for the connector according to the fifth embodiment.

As shown in FIG. 13A, the housing 21 forms an L shape which extends upward and then forward in side view. As shown in FIG. 13B, the housing 21 is provided with a circuit board insertion hole 27 which, as in the first embodiment, is recessed from front to rear, and multiple terminal holes 402 having a shape different from the first embodiment. The terminal holes 402 are recessed parts provided in the housing 21, and terminal members 403 having a shape different from the first embodiment are accommodated therein, respectively.

Each of the terminal holes 402 includes a terminal hole main part 402A extending upward from a lower surface of a rear portion of the housing 21, and a terminal hole front part 402B extending forward from the upper end of the terminal hole main part 402A. The terminal hole front parts 402B are positioned above the circuit board insertion hole 27 and, similarly to the first embodiment, are each in communication with the circuit board insertion hole 27 at the lower portion thereof. The terminal hole main parts 402A are separated by partition walls 404 each having surfaces facing in the left-right direction. Each of the terminal hole main parts 402A opens toward the rear.

Each terminal member 403 forms an L shape which extends upward and then forward in side view. Similarly to the first embodiment and the third embodiment, the terminal member 403 is provided with a cable connection part 405, a casing 37 provided on the front side of the cable connection part 405 and extending in the front-rear direction, and a spring piece 39 supported by the casing 37. The casing 37 and the spring piece 39 are similar to those of the first embodiment, while the structure of the cable connection part 405 differs from the other embodiments.

The cable connection part 405 is connected to the rear end of the casing 37 and extends downward. A substantially central part of the cable connection part 405 in the up-down direction is provided with a tubular crimp part 41, and the conductor 45 of the cable 43 is crimped to the crimp part 41. Thereby, the terminal member 403 is conductively connected to the conductor 45 of the cable 43.

The terminal member 403 is accommodated and fixed in the terminal hole 402 of the housing 21, with the casing 37 and the spring piece 39 accommodated in the terminal hole front part 402B of the terminal hole 402 and the cable connection part 405 accommodated in the terminal hole main part 402A. The cable 43 connected to the cable connection part 405 extends downward from the lower end of the rear portion of the housing 21. The rear surface of the partition wall 404 is positioned rearward of the cable connection part 405.

Next, effects of the connection structure 401 configured as above will be described. As in the second embodiment, the circuit board restricting parts 15 protrude into the through holes 14 of the circuit board 2, whereby the forward movement of the circuit board 2 is restricted. Also, the projecting pieces 203 provided on the holder 10 contact the flanges 50 of the connector 3, whereby the rearward movement of the connector 3 is restricted. Therefore, each of the movement of the circuit board 2 in the direction separating from the connector 3 and the movement of the connector 3 in the direction separating from the circuit board 2 is restricted, so that the separation of the circuit board 2 and the connector 3 is prevented.

Similarly to the first embodiment, when the circuit board 2 is not fully inserted into the connector 3, the worker can move the connector 3 to the full insertion position by pressing forward the pressing surfaces 54 of the flanges 50. Further, the worker can also move the connector 3 to the full insertion position by pressing forward the rear end surfaces of the partition walls 404. In this way, the surface to be pressed to properly connect the connector 3 to the circuit board 2 becomes larger than in the second embodiment, and thus, the workability of assembling the connector 3 to the circuit board 2 improves.

Concrete embodiments have been described in the foregoing, but the present invention the present invention may be modified or altered in various ways without being limited to the above embodiments or modifications.

In the above embodiments, each of the terminal members 23 is provided with two contacts, but it is not limited to this mode. Each terminal member 23 may be in any form so long as it is provided with one or more contacts.

In the above embodiments, each circuit board restricting parts 15 has a cylindrical columnar shape, but it is not limited to this mode. For example, the circuit board restricting part 15 may have a prismatic shape. The circuit board restricting part 15 may have any of various shapes, such as a concave shape, matching the shape of the connector 3 or the circuit board 2.

Figure 14A:
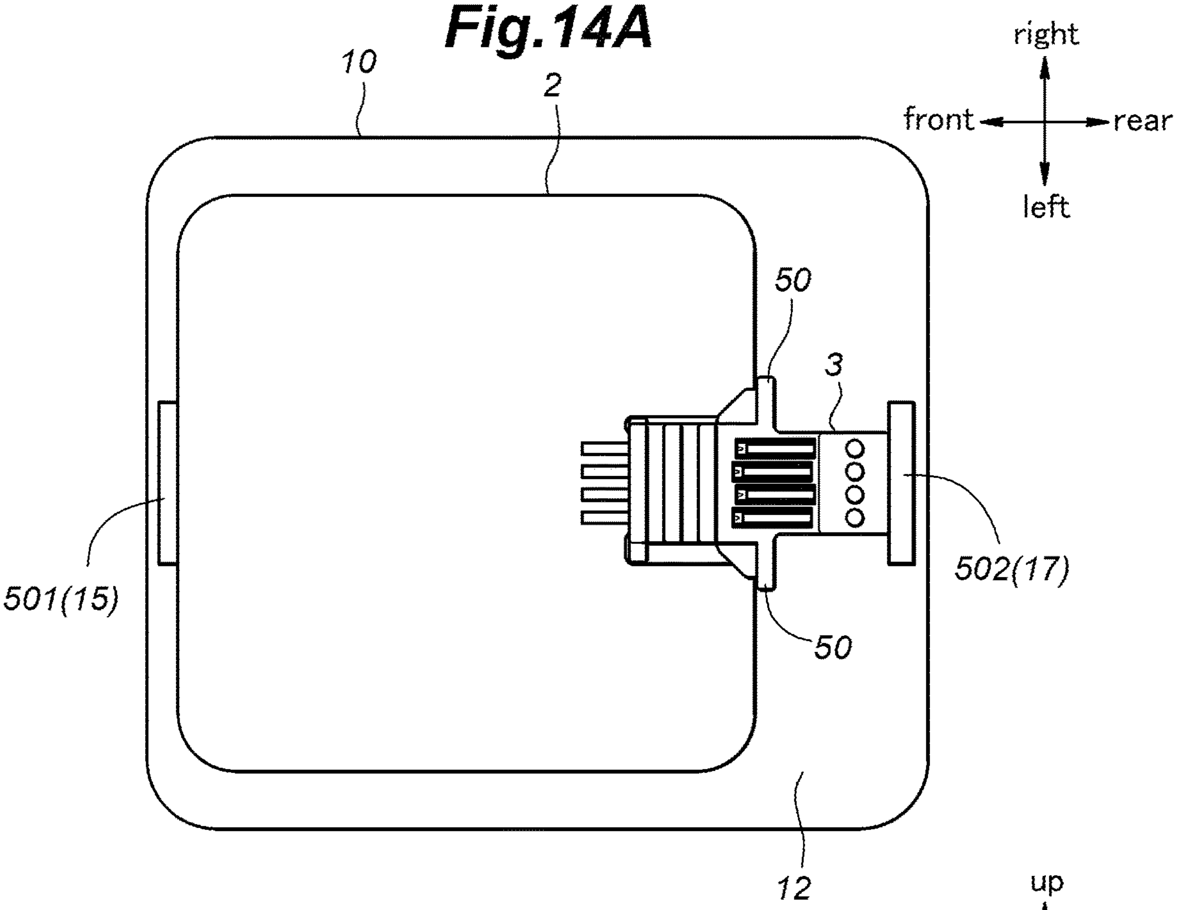
FIGS. 14A and 14B are a top view and a side view of a first modification of the connection structure for the connector.
Figure 14B:
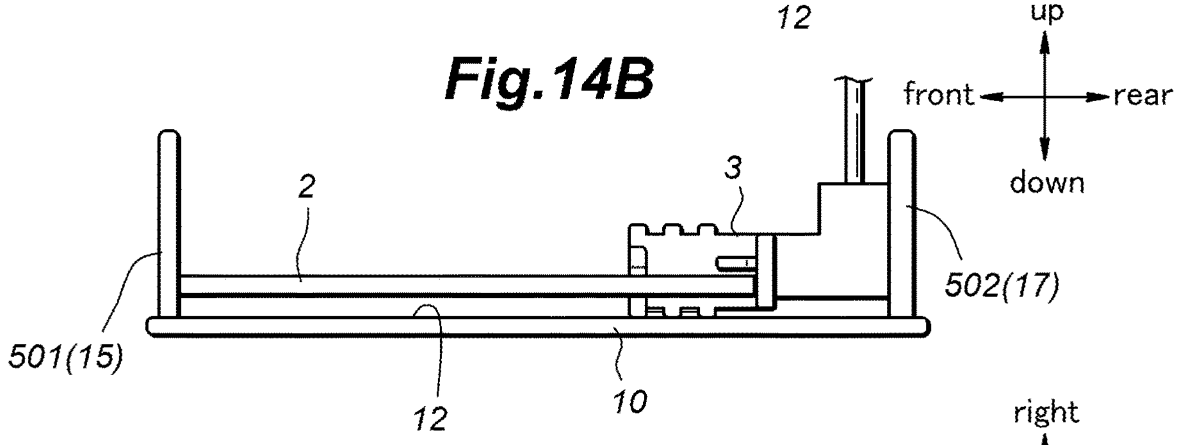

Also, in the above embodiments, the forward movement of the circuit board 2 is restricted by the circuit board restricting parts 15 inserted into the through holes 14 provided in the circuit board 2, but they are not limited to this mode. The circuit board restricting parts 15 may be in any form so long as they restrict the movement of the circuit board 2 in the direction separating from the connector 3. For example, as shown in FIGS. 14A and 14B, the circuit board restricting part 15 may be a wall body 501 protruding from the support surface 12 and contacting the front end surface of the circuit board 2 from the front to restrict the forward movement of the circuit board 2. Besides, the circuit board restricting part 15 may be in any form that fixes the circuit board 2 to the holder 10, 202. For example, it may fix the circuit board 2 by screwing, riveting, pinching by other members, ultrasonic welding, welding, adhesive agent, etc.

In the above embodiments, the flanges 50 of the connector 3 contact the projecting wall 17 or the projecting pieces 203 provided on the holder 10 to restrict the movement of the connector 3 in the direction separating from the circuit board 2 (rearward movement), but they are not limited to this mode. So long as the projecting wall 17 or the projecting pieces 203 restrict the movement of the connector 3 in the direction separating from the circuit board 2, the present invention is not limited by the location where the projecting wall 17 or the projecting pieces 203 contact the connector 3.

Figure 14C:
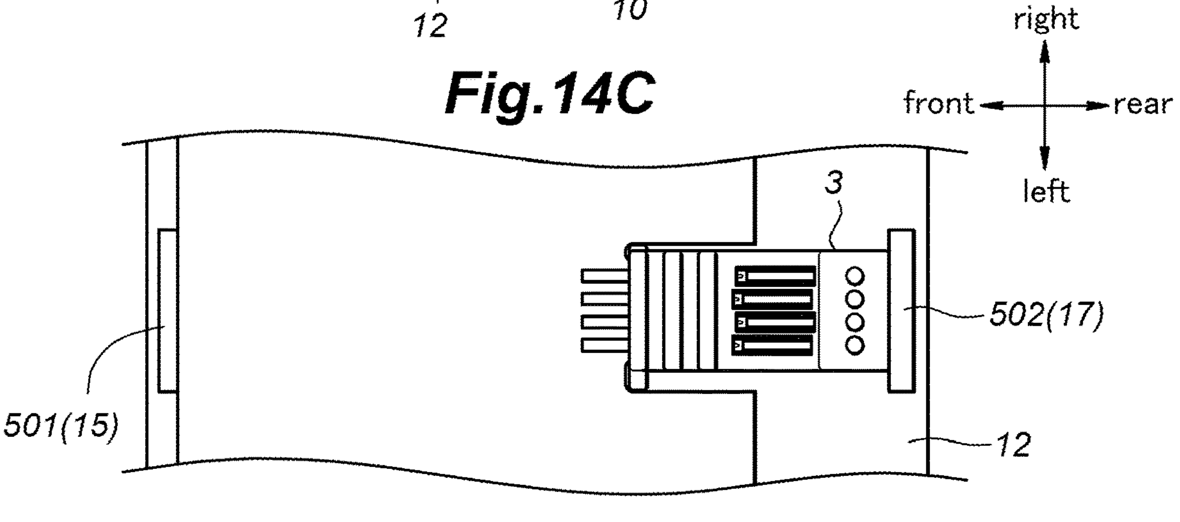
FIG. 14C is a top view of a second modification of the same.

Specifically, as shown in FIGS. 14A and 14B, for example, the projecting wall 17 may be a wall body 502 that protrudes from the support surface 12 and contacts the rear end surface of the connector 3 to restrict the movement of the connector 3 in the direction separating from the circuit board 2 (rearward direction). As shown in FIG. 14C, the flanges 50 are not indispensable, and any form may be adopted so long as the movement of the connector 3 in the direction separating from the circuit board 2 is restricted.

In the above embodiments, the holder 10 is constituted of a single member, but it is not limited to this mode. The holder 10 may be constituted of multiple members. Specifically, the holder 10 may be configured by a combination of a member (first member) provided with the support surface 12 and the circuit board restricting parts 15 and a member (second member) provided with a connector restricting part including at least one of the projecting walls 17, the projecting pieces 203, and the wall body 502. The second member may be assembled to the first member after the circuit board 2 is assembled to the support surface 12 of the first member.

Figure 15A:
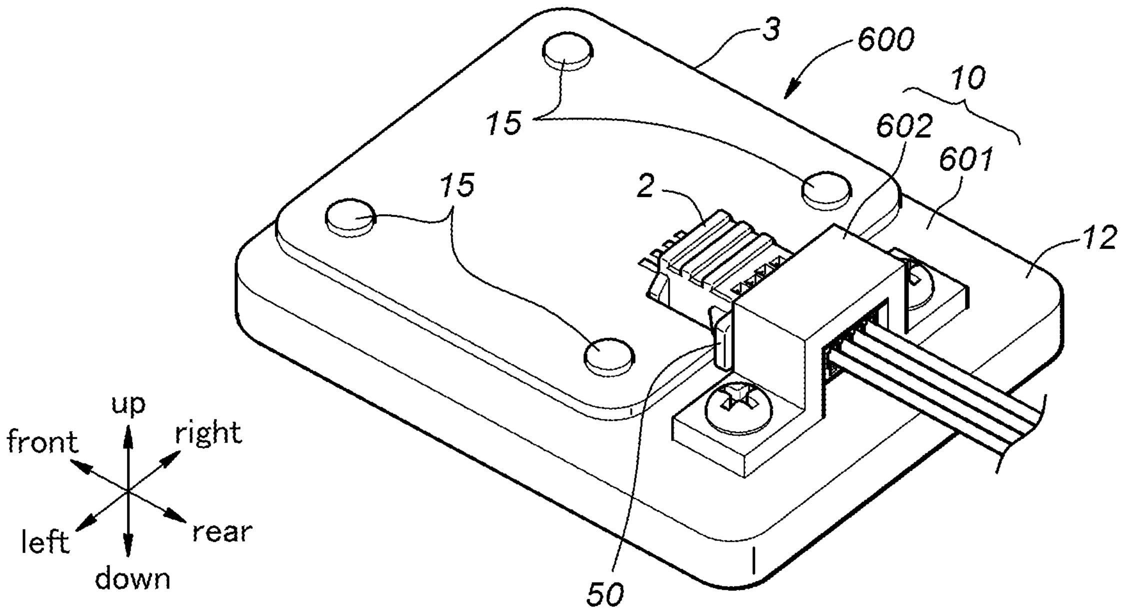
FIGS. 15A and 15B show perspective views of a third modification of the connection structure for the connector and a fourth modification of the same.

FIG. 15A shows a connection structure 600 according to a modification. The holder 10 constituting the connection structure 600 may be composed of a first member 601 having a flat plate shape and a second member 602 joined to the support surface 12 of the first member 601. FIG. 15A shows an example in which the second member 602 is fastened to the support surface 12 and contacts the flanges 50 of the connector 3 so that the rearward movement thereof is restricted, but this is just an example, and it is not limited to this mode. The second member 602 may be in any form so long as the second member 602 engages with the connector 3 and restricts the movement thereof in the direction separating from the circuit board 2.

Figure 15B:
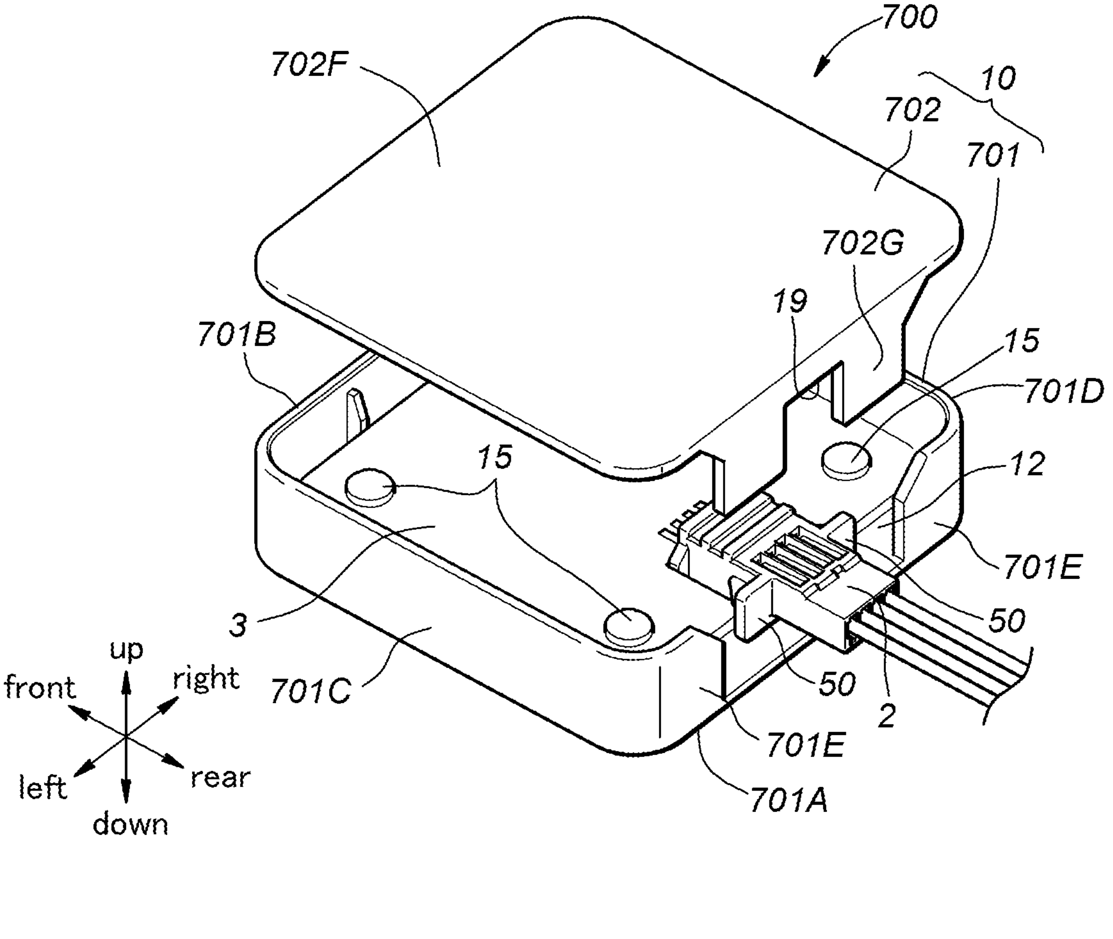

The holder 10 may be constituted of a first member 701 forming a box body and a second member 702 forming a lid body for the first member 701. In an example of FIG. 15B, the first member 701 has a bottom wall 701A, a front wall 701B, a left wall 701C, a right wall 701D, and two rear wall edge parts 701E. The support surface 12 is provided on the upper side of the bottom wall 701A. The second member 702 has an upper wall 702F and a rear wall central part 702G. The rear wall central part 702G is provided with an opening 19 for passing the connector 3 therethrough. When the first member 701 and the second member 702 are combined, the circuit board 2 is accommodated therein and sealed. At this time, the rear wall central part 702G is positioned rearward of the connector 3 and restricts the rearward movement of the connector 3. Namely, the rear wall central part 702G functions as the connector restricting part. Note, however, that FIG. 15B is just an example, and the second member 702 may include a left wall and a right wall, so that they engage with the flanges 50 to restrict the rearward movement of the connector 3. Namely, the second member 702 may be in such a form that when combined with the first member 701, the second member 702 engages with the connector 3 to restrict the movement in the direction separating from the circuit board 2.

Also, as in the above embodiments, after the circuit board 2 is supported on and temporarily fixed to the holder 10, at least one of the circuit board 2 and the connector 3 may be joined to the holder 10 by screwing, riveting, pinching by other members, ultrasonic welding, welding, adhesive agent, etc.

In the above embodiments, the flange 50 is configured to have a flat plate shape, but it is not limited to this mode. The flange 50 may have any shape and structure so long as it engages with the connector restricting part such as the projecting wall 17, the projecting piece 203, etc. and exerts a function of preventing the separation of the connector 3 from the circuit board 2. For example, in the case where the connector restricting part has a cylindrical columnar shape protruding from the support surface 12, the flange 50 may have a corresponding shape. For example, the flange 50 may have a cylindrical shape corresponding to the outer surface of the connector restricting part, or the rear surface thereof may be in a semi-circular shape. Also, the flange 50 may be connected to the connector restricting part by an elastic member (for example, rubber, etc.), a string, a chain, a screw, etc., or the flange 50 may be joined to the connector restricting part by welding, adhesion, etc., and cooperate with the connector restricting part to restrict the rearward movement of the connector 3.

LIST OF REFERENCE NUMERALS

1: connection structure according to the first embodiment
2: circuit board
3: connector
5: slit
6: connection part
8: terminal
10: holder
12: support surface
14: through hole
15: circuit board restricting part
15A: rib
17: projecting wall (projecting piece, connector restricting part)
17A: reinforcement wall
18: accommodation space
19: opening
21: housing
23: terminal member
25: terminal hole
27: circuit board insertion hole
29: extension part
31: communication hole
33: lance piece
35: cable connection part
37: casing
39: spring piece
39A: pressing part
39B: contact part
39C: projecting part
41: crimp part
43: cable
45: conductor
47: groove-shaped cross-section part
47A: bottom wall
47B: left wall
47C: right wall 47D: locking hole
47E: through hole
50: flange
50A: left flange
50B: right flange
52: flange reinforcement piece
54: pressing surface
101: connection structure according to the second embodiment
102: holder
103: peripheral wall
103A: opening edge part
105: extension wall
107: slope
109: vertical wall
201: connection structure according to the third embodiment
202: holder
203: projecting piece (connector restricting part)
203A: projecting piece main part
203B: projecting piece reinforcement part
301: connection structure according to the fourth embodiment
302: terminal hole
302A: terminal hole main part
302B: terminal hole front part
303: terminal member
304: partition wall
305: cable connection part
401: connection structure according to the fifth embodiment
402: terminal hole
402A: terminal hole main part
402B: terminal hole front part
403: terminal member
404: partition wall
405: cable connection part
501: wall body
502: wall body
600: connection structure
601: first member
602: second member
701: first member
701A: bottom wall
701B: front wall
701C: left wall
701D: right wall
701E: rear wall edge part
702: second member
702F: upper wall
702G: rear wall central part

The invention claimed is:

1. A connection structure for a connector to be connected to a connection part of a circuit board supported by a holder, wherein the connection part and the connector are joined in an insertable/removable manner, and the holder is provided with:

a circuit board restricting part configured to engage with the circuit board electrically connected to the connector to restrict movement of the circuit board in a direction separating from the connector; and a connector restricting part configured to engage with the connector electrically connected to the circuit board to restrict movement of the connector in a direction separating from the circuit board, the connector is provided with a flange extending out in a direction perpendicular to a connection direction of the connector, the holder is provided with a support surface for supporting the circuit board, the connector restricting part includes a projecting piece that projects from a part of the support surface on a side of the flange away from the circuit board, and when the connector is moved in a direction separating from the circuit board, the projecting piece contacts the flange and restricts movement of the connector.

2. The connection structure for the connector according to claim 1, wherein the flange is provided with a pressing surface facing a distal side in the connection direction.

3. The connection structure for the connector according to claim 1, wherein the projecting piece is provided with a slope that is inclined toward the circuit board as approaching the support surface.

4. The connection structure for the connector according to claim 1, wherein a surface of the flange on a side of the circuit board is in parallel with an end surface of the circuit board on a side of the connection part.

5. The connection structure for the connector according to claim 1, wherein when a distance between the circuit board and the connector in an insertion direction is greater than a predetermined threshold value, the flange and the projecting piece cooperate to prohibit support of the circuit board on the holder.

6. The connection structure for the connector according to claim 5, wherein the connector includes at least one terminal member which can be electrically connected to a terminal(s) of the circuit board by contacting the terminal(s) of the circuit board, and when the distance is less than or equal to the threshold value, all of the terminal member(s) of the connector is/are connected to the corresponding terminal(s) of the circuit board.

7. The connection structure for the connector according to claim 5, wherein the connector includes at least one terminal member which can be electrically connected to a terminal(s) of the circuit board by contacting the terminal(s) of the circuit board, the terminal member is provided with multiple contacts configured to contact the terminal of the circuit board, and when the distance is less than or equal to the threshold value, at least one contact of the multiple contacts included in each terminal member contacts the corresponding terminal of the circuit board.

8. The connection structure for the connector according to claim 5, wherein the connector includes at least one terminal member which can be electrically connected to a terminal(s) of the circuit board by contacting the terminal(s) of the circuit board, the terminal member is provided with multiple contacts configured to contact the terminal of the circuit board, and when the distance is less than or equal to the threshold value, all of the contacts of the terminal member contact the corresponding terminal of the circuit board.

9. The connection structure for the connector according to claim 1, wherein the connection part includes an electrically conductive pattern extending in the connection direction on a surface of the circuit board.

* * * * *